United States Patent
Miyake et al.

(10) Patent No.: US 11,174,337 B2
(45) Date of Patent: Nov. 16, 2021

(54) ISOCYANATE COMPOSITION, METHOD FOR PRODUCING ISOCYANATE POLYMER AND ISOCYANATE POLYMER

(71) Applicant: ASAHI KASEI KABUSHIKI KAISHA, Tokyo (JP)

(72) Inventors: Nobuhisa Miyake, Tokyo (JP); Masaaki Shinohata, Tokyo (JP); Atsushi Ohkubo, Tokyo (JP); Koichi Nakaoka, Tokyo (JP); Yuji Kosugi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 252 days.

(21) Appl. No.: 16/340,633

(22) PCT Filed: Oct. 13, 2017

(86) PCT No.: PCT/JP2017/037277
§ 371 (c)(1),
(2) Date: Apr. 9, 2019

(87) PCT Pub. No.: WO2018/070541
PCT Pub. Date: Apr. 19, 2018

(65) Prior Publication Data
US 2020/0048405 A1    Feb. 13, 2020

(30) Foreign Application Priority Data

Oct. 14, 2016 (JP) .............................. JP2016-203113
Oct. 14, 2016 (JP) .............................. JP2016-203144

(51) Int. Cl.
*C08G 18/81* (2006.01)
*C08G 18/09* (2006.01)
*C08G 18/73* (2006.01)
*C08K 5/205* (2006.01)
*C08K 5/06* (2006.01)

(52) U.S. Cl.
CPC ........ *C08G 18/8116* (2013.01); *C08G 18/092* (2013.01); *C08G 18/73* (2013.01); *C08K 5/06* (2013.01); *C08K 5/205* (2013.01)

(58) Field of Classification Search
CPC . C08K 5/205; C08K 5/06; C08K 5/10; C08K 5/01; C08K 5/005; C08G 18/81; C08G 18/8108; C08G 18/8116; C08G 18/8125; C08G 18/8141; C08G 18/815; C08G 18/8158; C08G 18/8166; C08G 18/8175; C08G 18/8183; C08G 18/8191; C08G 18/79; C08G 18/791; C08G 18/792; C08G 18/794; C08G 18/795; C08G 18/797; C08G 18/798; C08G 18/728; C08G 18/73; C08G 18/735
See application file for complete search history.

(56) References Cited

U.S. PATENT DOCUMENTS

| | | | |
|---|---|---|---|
| 4,774,178 A | 9/1988 | Egerer et al. | |
| 5,260,439 A * | 11/1993 | Suzuki ................. | C07D 251/34 544/222 |
| 5,597,661 A | 1/1997 | Takeuchi et al. | |
| 5,821,292 A * | 10/1998 | Aumuller ................. | C08K 5/10 524/291 |
| 6,245,935 B1 | 6/2001 | Misu et al. | |
| 2007/0197762 A1 | 8/2007 | Nozawa et al. | |
| 2012/0232183 A1 | 9/2012 | Ooga et al. | |
| 2013/0023694 A1 | 1/2013 | Steiger et al. | |
| 2013/0317248 A1 | 11/2013 | Nishimura et al. | |
| 2013/0317252 A1 | 11/2013 | Nishimura et al. | |
| 2015/0210631 A1 * | 7/2015 | Shinohata ............. | C07C 271/56 560/336 |

FOREIGN PATENT DOCUMENTS

| | | |
|---|---|---|
| CA | 2130685 A1 | 3/1995 |
| EP | 0614921 A2 | 9/1994 |
| EP | 0 936 214 A2 | 8/1999 |
| EP | 2 915 803 A1 | 9/2015 |

(Continued)

OTHER PUBLICATIONS

JP2008143872 English Machine Translation, prepared Feb. 10, 2021. (Year: 2021).*
JP2007084809 English Machine Translation, prepared Feb. 10, 2021. (Year: 2021).*
Becker, H., et al., "The Role of Hydroquinone Monomethyl Ether in the Stabilization of Acrylic Acid.", Chem. Eng. Technol, 29(10), pp. 1227-1231, 2006. (Year: 2006).*
International Search Report issued in corresponding International Application No. PCT/JP2017/037277, dated Jan. 9, 2018.

(Continued)

*Primary Examiner* — Christopher M Rodd
(74) *Attorney, Agent, or Firm* — Morgan, Lewis & Bockius LLP

(57) ABSTRACT

The present invention provides an isocyanate composition including an isocyanate compound having an ethylenically unsaturated bond, a compound represented by formula (1) (in the formula, $R^1$ represents an a-valent organic group, $R^2$ represents a monovalent organic group, a represents an integer of 1 or 2), and/or a compound having a UV absorption in a spectral region of a decamer or higher isocyanate measured by gel permeation chromatography; and an isocyanate composition including an isocyanate compound having an ethylenically unsaturated bond, or a compound having at least one unsaturated bond other than an unsaturated bond constituting an aromatic ring or an inert compound such as a hydrocarbon compound or the like and having a carbon-carbon unsaturated bond other than an unsaturated bond constituting an aromatic ring; or the like $$R^1-(COO-R^2)_a \qquad (1).$$

17 Claims, 1 Drawing Sheet

(56) References Cited

FOREIGN PATENT DOCUMENTS

| | | | |
|---|---|---|---|
| JP | 60-231718 A | 11/1985 | |
| JP | 60-234582 A | 11/1985 | |
| JP | 60-234583 A | 11/1985 | |
| JP | 04-154824 A | 5/1992 | |
| JP | 06-187822 A | 7/1994 | |
| JP | 06-322051 A | 11/1994 | |
| JP | 07-149705 A | 6/1995 | |
| JP | 09-323968 A | 12/1997 | |
| JP | 10-077328 A | 3/1998 | |
| JP | 11-228523 A | 8/1999 | |
| JP | 2006-232797 A | 9/2006 | |
| JP | 2007-084809 A | 4/2007 | |
| JP | 2007084809 A | * | 4/2007 |
| JP | 2008-143872 A | 6/2008 | |
| JP | 2008143872 A | * | 6/2008 |
| JP | 4273531 B2 | 6/2009 | |
| JP | 4823546 B2 | 11/2011 | |
| JP | 2013-523881 A | 6/2013 | |
| JP | 2016-150922 A | 8/2016 | |
| WO | 2011/074503 A1 | 6/2011 | |
| WO | 2011/130032 A1 | 10/2011 | |
| WO | 2012/111445 A1 | 8/2012 | |
| WO | 2012/111446 A1 | 8/2012 | |
| WO | 2013-060614 A1 | 5/2013 | |
| WO | 2014/069605 A1 | 5/2014 | |

OTHER PUBLICATIONS

Sigma-Aldrich: "Tris[2-(acryloyloxy)ethyl] isocyanurate Sigma Aldrich CAS 40220-08-4", Sigma Aldrich Online Catalogue, Jan. 1, 2019 (Jan. 1, 2019), XP055627581, Retrieved from the Internet: URL:https://www.sigmaaldrich.com/catalog/product/aldrich/407534?lang=de&region=DE&gclid=EAIalQobChMI-eik1Pn65AIVx5rVCh34ZAEkEAAYASAAEgJ0PfD_BwE [retrieved on-Oct. 1, 2019].
European Search Report issued in corresponding European Patent Application No. 17860948.3 dated Oct. 15, 2019.
Written Opinion issued in corresponding International Patent Application No. PCT/JP2017/037277, dated Jan. 9, 2018.
Sheng Maoqui and Deng Guiqin, "Production Technology and Uses of Novel Polyurethane Resin Paint," p. 208 Guangdong Science & Technology Press (2001).
CAS40220-08-4, STN Registry, 19841116 (2020).

* cited by examiner

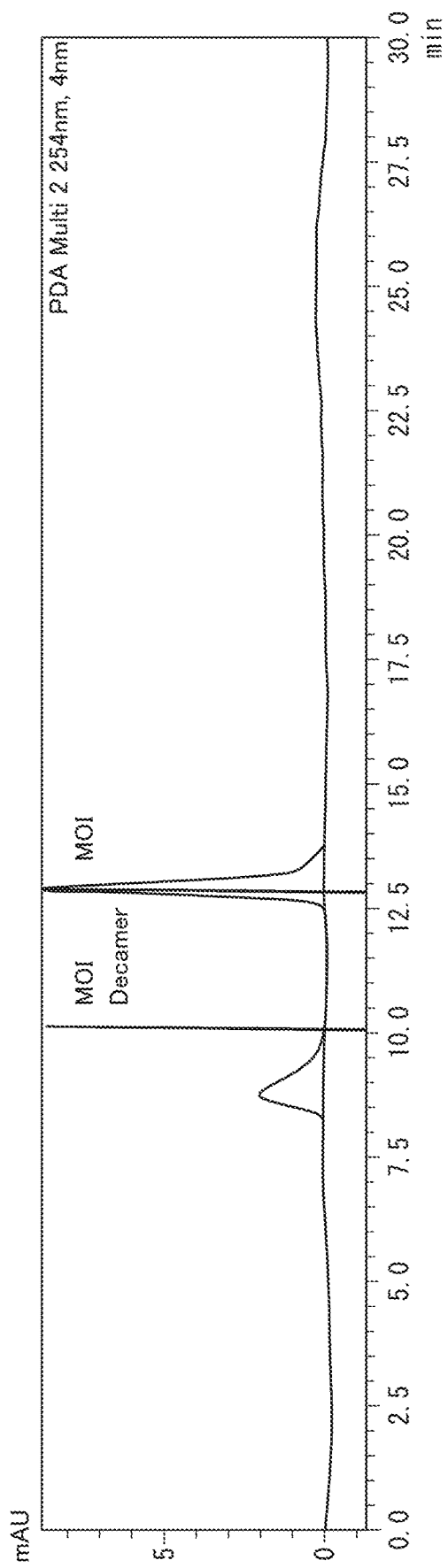

ISOCYANATE COMPOSITION, METHOD FOR PRODUCING ISOCYANATE POLYMER AND ISOCYANATE POLYMER

Priority is claimed on Japanese Patent Application No. 2016-203144, filed Oct. 14, 2016, and Japanese Patent Application No. 2016-203113, filed Oct. 14, 2016, the content of which is incorporated herein by reference.

TECHNICAL FIELD

The present invention relates to an isocyanate composition, a method for producing an isocyanate polymer, and an isocyanate polymer.

BACKGROUND ART

Isocyanates having ethylenically unsaturated bonds are useful as various intermediates for synthesis. For example, there is an unsaturated urethane compound produced by reacting a methacryloyloxyethyl isocyanate which is an unsaturated isocyanate compound with a polyalkylene glycol which is a compound having a hydroxyl group, and it is proposed to use this unsaturated urethane compound as a material of a contact lens (for example, see Patent Document 1), a solid solvent material of a solid polymer electrolyte (for example, see Patent Document 2) or a material for immobilizing a biological material (for example, see Patent Documents 3 and 4).

A method for producing a compound having an ethylenically unsaturated bond by a reaction between a corresponding amine and a phosgene is disclosed (see Patent Document 5). However, the compound having an ethylenically unsaturated bond produced by such a method may contain impurities such as by-products and catalyst residues in some cases, and therefore, after synthesis of a compound having an ethylenically unsaturated bond, operations to raise the purity by removing the impurities are generally performed (for example, see Patent Documents 6 and 7).

Further, a method of adding a polymerization inhibitor (for example, see Patent Document 8) and a method of adding a tertiary amine hydrochloride for transporting and storing an isocyanate compound having an ethylenically unsaturated bond are disclosed (For example, refer to Patent Document 9).

PRIOR ART LITERATURE

Patent Documents

[Patent Document 1] Japanese Unexamined Patent Application, First Publication No. H6-322051
[Patent Document 2] Japanese Unexamined Patent Application, First Publication No. H6-187822
[Patent Document 3] Japanese Unexamined Patent Application, First Publication No. S60-234582
[Patent Document 4] Japanese Unexamined Patent Application, First Publication No. S60-234583
[Patent Document 5] Japanese Unexamined Patent Application, First Publication No. 2006-232797
[Patent Document 6] Japanese Patent No. 4273531
[Patent Document 7] Japanese Patent No. 4823546
[Patent Document 8] PCT International Publication No. WO 2011/074503
[Patent Document 9] Japanese Unexamined Patent Application, First Publication No. 2016-150922

DISCLOSURE OF INVENTION

Problems to be Solved by the Invention

The compound having an ethylenically unsaturated bond contains as a reactive functional group an ethylenically unsaturated bond and an isocyanate group in the molecule. The compound added in the above-mentioned conventionally known method is a polymerization inhibitor and used for the purpose of suppressing the polymerization of the ethylenically unsaturated bonds. On the other hand, although the isocyanate constituting the compound having an ethylenically unsaturated bond depends on the structure thereof, in many cases, the isocyanate group is unstable (high reactivity) due to the effect of the ethylenically unsaturated bond and, in some cases, the intrinsic ester bond. For this reason, the above-mentioned compound known as a stabilizer of the isocyanate composition was not effective in improving the stability of the isocyanate.

In view of such circumstances, an object of the present invention is to provide an isocyanate composition containing an isocyanate having an ethylenically unsaturated bond, which has an excellent storage stability.

Means for Solving the Problems

As a result of intensive studies, the present inventors have found that the above object can be achieved by an isocyanate composition including specific components, and thus have completed the present invention.

That is, the present invention includes the following aspects.

[1] An isocyanate composition, including
an isocyanate compound having an ethylenically unsaturated bond; and
1.0 to $1.0 \times 10^4$ ppm by mass of a compound represented by the following formula (1) which is different from the isocyanate compound with respect to a total mass of the isocyanate compound, and/or 1.0 to $1.0 \times 10^4$ ppm by mass of a compound having a UV absorption in a spectral region of a decamer or higher isocyanate measured by gel permeation chromatography with respect to a total mass of the isocyanate compound, and/or 1.0 to $1.0 \times 10^4$ ppm by mass of a compound having an isocyanurate group, and/or a biuret group with respect to a total mass of the isocyanate compound.

[Chemical formula 1]

(in the formula, $R^1$ represents an a-valent organic group, $R^2$ represents a monovalent organic group, and a represents an integer of 1 or 2.)

[2] The isocyanate composition according to [1], wherein the isocyanate composition further includes, with respect to a total mass of the isocyanate compound, 1.0 to $2.0 \times 10^4$ ppm by mass of at least one inert compound selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound, the inert compound not having a carbon-carbon unsaturated bond and a carbon-oxygen double bond other than an unsaturated bond constituting an aromatic ring.

[3] The isocyanate composition according to [1] or [2], wherein the isocyanate composition further includes 1.0 to $2.0 \times 10^4$ ppm by mass of a carbonic acid derivative with respect to a total mass of the isocyanate compound.

[4] The isocyanate composition according to any one of [1] to [3], wherein the isocyanate composition further includes, with respect to a total mass of the isocyanate compound, 1.0 to $1.0\times10^2$ ppm by mass of a sulfuric acid and/or a sulfuric ester, and/or 1.0 to $1.0\times10^2$ ppm by mass of a phosphoric acid and/or a phosphoric ester.

[5] The isocyanate composition according to any one of [1] to [4], wherein the isocyanate composition further includes, with respect to a total mass of the isocyanate compound, 1.0 to $1.0\times10^4$ ppm by mass of a basic amino compound, and/or a halogen ion, and/or a hydrolysable halogen compound.

[6] An isocyanate composition, including
an isocyanate compound having an ethylenically unsaturated bond; and
with respect to a total mass of the isocyanate compound, 1.0 to $1.0\times10^4$ ppm by mass of a compound different from the isocyanate compound and having at least one unsaturated bond other than an unsaturated bond constituting an aromatic ring, or
with respect to a total mass of the isocyanate compound, 1.0 to $2.0\times10^4$ ppm by mass of an inert compound not having a carbon-carbon unsaturated bond other than an unsaturated bond constituting an aromatic ring, which is at least one selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound with respect to a total mass of the isocyanate compound, and/or 1.0 to $1.0\times10^2$ ppm by mass of a sulfuric acid and/or a sulfuric ester, and/or 1.0 to $1.0\times10^2$ ppm by mass of a phosphoric acid, and/or a phosphoric ester.

[7] The isocyanate composition according to [6], including
the isocyanate compound; and
the compound different from the isocyanate compound and having at least one unsaturated bond other than an unsaturated bond constituting an aromatic ring, wherein
the unsaturated bond other than an unsaturated bond constituting an aromatic ring is a double bond between carbon and oxygen.

[8] The isocyanate composition according to [7], wherein the compound having at least one unsaturated bond other than an unsaturated bond constituting an aromatic ring is a carbonic acid derivative.

[9] The isocyanate composition according to [8], wherein the carbonic acid derivative is at least one compound selected from the group consisting of a carbonic acid ester, N-unsubstituted carbamic acid ester, and N-substituted carbamic acid ester.

[10] The isocyanate composition according to [9], wherein the N-substituted carbamic acid ester is a compound represented by the following formula (2).

[Chemical formula 2]

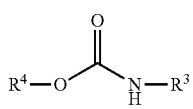

(2)

[In formula (2), $R^3$ represents an isocyanate group-removed residue of the isocyanate compound, and $R^4$ represents an organic group.]

[11] The isocyanate composition according to [10], including the isocyanate compound and the inert compound.

[12] The isocyanate composition according to [6], including the isocyanate compound, the compound different from the isocyanate compound and having at least one unsaturated bond other than an unsaturated bond constituting an aromatic ring, and the inert compound.

[13] The isocyanate composition according to [6], including the isocyanate compound, and the compound different from the isocyanate compound and having at least one unsaturated bond other than an unsaturated bond constituting an aromatic ring, wherein
the unsaturated bond other than an unsaturated bond constituting an aromatic ring is a double bond between carbon and oxygen.

[14] The isocyanate composition according to [13], wherein the compound having at least one unsaturated bond other than an unsaturated bond constituting an aromatic ring is a carbonic acid derivative.

[15] The isocyanate composition according to [14], wherein the carbonic acid derivative is at least one compound selected from the group consisting of a carbonic acid ester, an N-unsubstituted carbamic acid ester, and an N-substituted carbamic acid ester.

[16] The isocyanate composition according to any one of [1] to [15], wherein
97% by mass or more of the isocyanate compound is included with respect to a total mass of the isocyanate composition.

[17] A process for producing an isocyanate polymer, including
a step of mixing the isocyanate composition defined in any one of [1] to [16] and an isocyanate having two or more functional groups, and reacting the isocyanate compound contained in the isocyanate composition with the isocyanate having two or more functional groups, wherein
the isocyanate polymer contains a unit represented by the following formula (11), and
a nitrogen atom constituting the isocyanate polymer is bonded to a carbon atom.

[Chemical formula 3]

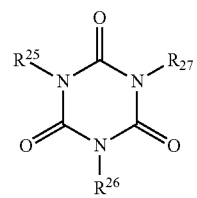

(11)

[In formula (11), each of $R^{25}$, $R^{26}$, and $R^{27}$ independently represents an isocyanate group-removed residue of the isocyanate compound contained in the isocyanate composition, or an isocyanate group-removed residue of the isocyanate having two or more functional groups, and at least one of $R^{25}$, $R^{26}$ and $R^{27}$ represents an isocyanate group-removed residue of the isocyanate compound contained in the isocyanate composition.]

[18] An isocyanate polymer including a unit represented by the following formula (11), wherein a nitrogen atom constituting the isocyanate polymer is bonded to a carbon atom.

[Chemical formula 4]

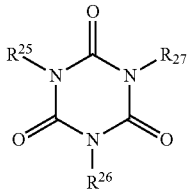

(11)

[In formula (11), each of $R^{25}$, $R^{26}$, and $R^{27}$ independently represents an isocyanate group-removed residue of an isocyanate compound having an ethylenically unsaturated bond, or an isocyanate group-removed residue of an isocyanate having two or more functional groups, and at least one of $R^{25}$, $R^{26}$ and $R^{27}$ represents an isocyanate group-removed residue of an isocyanate compound having an ethylenically unsaturated bond.]

Effects of the Invention

According to the present invention, an isocyanate composition is provided, including an isocyanate having an ethylenically unsaturated bond and which has improved storage stability.

BRIEF DESCRIPTION OF THE DRAWINGS

FIG. 1 is a gel permeation chromatography chart of the reaction product obtained in Synthesis Example B-2.

BEST MODE FOR CARRYING OUT THE INVENTION

Preferred embodiments of the present invention will be described below. It should be noted that the present invention is not limited to the following embodiments, and various modifications can be made within the scope of the gist thereof.
<Isocyanate Compound Having Ethylenically Unsaturated Bond>

In the isocyanate composition of the present invention, although the isocyanate compound having an ethylenically unsaturated bond is not particularly limited, a compound represented by the following formula (3) is preferably used.

[Chemical formula 5]

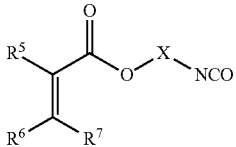

(3)

[In the formula, X represents an organic group, each of $R^5$, $R^6$ and $R^7$ independently represents a hydrogen atom, an alkyl group having 1 to 10 carbon atoms or an aromatic group having 4 to 10 carbon atoms.]

In formula (3), X is preferably an alkylene group having 1 to 8 carbon atoms which may contain either or both of an ether bond and a phenylene group, more preferably an alkylene group having 1 to 8 carbon atoms which may contain an ether bond, and still more preferably an alkylene group having 1 to 5 carbon atoms.

The alkylene group is preferably a linear or branched alkylene group.

Specific examples of the linear alkylene group include a methylene group, an ethylene group, a propylene group, a butylene group, a pentylene group, a hexylene group, a heptylene group, an octylene group, and the like.

Specific examples of the branched alkylene group include —C(CH$_3$)$_2$—, —CH(CH$_3$)—, —CH(CH$_2$CH$_3$)—, —C(CH$_3$)(CH$_2$CH$_3$)—, —C(CH$_3$)(CH$_2$CH$_2$CH$_3$)—, —C(CH$_2$CH$_3$)$_2$— and the like; —CH(CH$_3$)CH$_2$—, —CH(CH$_3$)CH(CH$_3$)—, —C(CH$_3$)$_2$CH$_2$—, —CH(CH$_2$CH$_3$)CH$_2$—, —C(CH$_2$CH$_3$)$_2$—CH$_2$— and the like.

The alkylene group is preferably a linear alkylene group, more preferably an alkylene group having 1 to 5 carbon atoms, and still more preferably an ethylene group.

The above alkylene group having 1 to 8 carbon atoms which may contain an ether bond means that an oxygen atom may be inserted between a carbon-carbon bond in the alkylene group having 1 to 8 carbon atoms, and specifically, it is represented by —(CH$_2$)$_a$—(O)$_b$—(CH$_2$)$_c$—(O)$_d$—(CH$_2$)$_e$—. In the formula, a+c+e represents an integer of 2 to 8, a and c each represents an integer of 1 or more, b and d represent 0 or 1, and e is 0 when d is 0.

Specific examples of the alkylene group having 1 to 8 carbon atoms which may contain an ether bond preferably include —CH$_2$—O—(CH$_2$)$_3$—, —(CH$_2$)$_2$—O—(CH$_2$)$_2$—, —(CH$_2$)$_3$—OCH$_2$—, —CH$_2$—O—(CH$_2$)$_2$—, —(CH$_2$)$_2$—O—CH$_2$—, —CH$_2$—O—CH$_2$—, more preferably include —CH$_2$—O—(CH$_2$)$_3$—, —(CH$_2$)$_2$—O—(CH$_2$)$_2$—, —(CH$_2$)$_3$—O—CH$_2$—, —CH$_2$—O—(CH$_2$)$_2$—. Among these examples, —(CH$_2$)$_2$—O—(CH$_2$)$_2$— is preferable.

Specific examples of the alkylene group having 1 to 8 carbon atoms which may contain both an ether bond and a phenylene group include —(CH$_2$)$_2$—P—O—, -Ph-O—(CH$_2$)$_2$—, —(CH$_2$)$_2$-Ph-O—(CH$_2$)$_2$—. Specific examples of the alkylene group having 1 to 8 carbon atoms which may contain a phenylene group include —(CH$_2$)$_2$-Ph—, -Ph-(CH$_2$)$_2$—, —(CH$_2$)$_2$-Ph-(CH$_2$)$_2$—.

Examples of X may include a phenylene group (-Ph-), a group containing an ether bond and a phenylene group (-Ph-O— or —O-Ph-).

In formula (3), each of $R^5$, $R^6$ and $R^7$ independently represents a hydrogen, an alkyl group having 1 to 10 carbon atoms or an organic group.

Examples of the alkyl group having 1 to 10 carbon atoms include a linear alkyl group and a branched chain alkyl group. Specific examples of the linear alkyl group include a methyl group, an ethyl group, a propyl group, a butyl group, a pentyl group, a hexyl group and the like. Specific examples of the branched chain alkyl group include 1-methylethyl group, 1-methylpropyl group, 2-methylpropyl group, 1-methylbutyl group, 2-methylbutyl group, 3-methylbutyl group, 1-ethylbutyl group, 2-ethylbutyl group and the like.

$R^5$, $R^6$ and $R^7$ may be aromatic groups having 4 to 10 carbon atoms. Specific examples of the aromatic group include a phenyl group, a naphthyl group, a furan group, a pyrrole group, an indole group and the like.

Specific examples of the isocyanate compound represented by the general formula (3) include acrylic acid-2-isocyanato-ethyl ester, 2-methyl-acrylic acid-2-isocyanato-ethyl ester, acrylic acid-2-isocyanato-propyl ester, 2-methyl-acrylic acid-2-isocyanato-propyl ester, acrylic acid-3-isocyanato-propyl ester, 2-methyl-acrylic acid-3-isocyanato-propyl ester, acrylic acid-4-isocyanato-butyl ester, 2-methyl-acrylic acid-4-isocyanato-butyl ester, acrylic acid-5-isocyanato-pentyl ester, 2-methyl-acrylic acid-5-isocyanato-pentyl ester, acrylic acid-6-isocyanato-hexyl ester, 2-methyl-acrylic acid-6-isocyanato-hexyl ester, acrylic acid-8-isocyanato-octyl ester, 2-methyl-acrylic acid-8-isocyanato-octyl ester, acrylic acid-10-isocyanato-decyl ester, 2-methyl-acrylic acid-10-isocyanato-decyl ester, acrylic acid-11-isocyanato-undecyl ester, 2-methyl-acrylic acid-11-isocyanato-undecyl ester, acrylic acid-12-isocyanato-dodecyl ester, 2-Methyl-acrylic acid-12-isocyanato-dodecyl ester and the like.

Among the examples, from the viewpoints of being suitable for applications requiring weather resistance and thermal yellowing resistance and being industrially easy to obtain, acrylic acid-2-isocyanato-ethyl ester, 2-methyl-acrylic acid-2-isocyanato-ethyl ester, acrylic acid-2-isocyanato-propyl ester, 2-methyl-acrylic acid-2-isocyanato-propyl ester, acrylic acid-3-isocyanato-propyl ester, 2-methyl-acrylic acid-3-isocyanato-propyl ester is preferred. The above isocyanate compounds may be used alone or in combination.

The isocyanate compound having an ethylenically unsaturated bond may be produced by any method, and may also be produced by a well-known method.

<Compound Represented by Formula (1)>

The compound represented by the following formula (1) in the present invention will be described.

[Chemical formula 6]

$$R^1\text{—}(COO\text{—}R^2) \quad (1)$$

(In the formula, $R^1$ represents an a-valent organic group, $R^2$ represents a monovalent organic group, and a represents an integer of 1 or 2.)

In the above formula (1), $R^1$ is preferably an aliphatic group having 2 to 10 carbon atoms or an aromatic group having 6 to 10 carbon atoms. Specifically, examples of the aliphatic group include residues obtained by removing "a" number of hydrogen atoms from a compounds such as methane, ethane, propane, butane, heptane, hexane, heptane, octane, nonane, decane, and examples of the aromatic group include residues obtained by removing "a" number of hydrogen atoms from a compound such as benzene, methylbenzene, ethylbenzene, butylbenzene, octylbenzene, nonylbenzene, diphenyl, terphenyl, phenylpropylbenzene, di (phenylpropyl) benzene, diphenyl ether or the like.

In the above formula (1), $R^2$ is preferably an aliphatic group having 2 to 10 carbon atoms or an aromatic group having 6 to 25 carbon atoms. Specifically, examples of the aliphatic group include residues obtained by removing "a" number of hydrogen atoms from a compounds such as methane, ethane, propane, butane, heptane, hexane, heptane, octane, nonane, decane or the like, and examples of the aromatic group include residues obtained by removing "a" number of hydrogen atoms from a compound such as benzene, methylbenzene, ethylbenzene, butylbenzene, octylbenzene, nonylbenzene, diphenyl, terphenyl, phenylpropylbenzene, di (phenylpropyl) benzene, diphenyl ether or the like.

Considering the preferable $R^1$ and $R^2$ described above, specific examples of the compound represented by the above formula (1) include ethyl acetate, butyl acetate, hexyl acetate, methyl propionate, ethyl butyrate, butyl butyrate, ethyl valerate, butyl valerate, ethyl hexanoate, ethyl octanoate, butyl caprate, phenyl acetate, benzyl acetate, methyl benzoate, ethyl benzoate, phenyl benzoate, benzyl benzoate, diethyl phthalate, dibutyl phthalate, benzyl butyl phthalate and the like.

Further, the compound represented by the above formula (1) may be a reaction product of a compound having an ethylenically unsaturated bond with a hydroxy compound to be described later. Specifically, for example, when the compound having an ethylenically unsaturated bond is a compound represented by the above formula (3) and the hydroxy compound is a compound represented by the following formula (16), and the compound represented by formula (1) is a reaction product of these compounds, the compound represented by the above formula (1) may be a compound represented by the following formula (14).

[Chemical formula 7]

$$R^2OH \quad (16)$$

[In the formula, $R^2$ represents a group defined in the above formula (1).]

[Chemical formula 8]

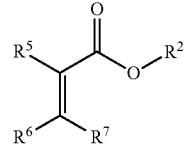

(14)

[In the formula, $R^2$ represents a group defined in the above formula (1), and $R^5$, $R^6$ and $R^7$ represent a group defined in the above formula (3).]

<Compound Having a UV Absorption in a Spectral Region of a Decamer or Higher Isocyanate Measured by Gel Permeation Chromatography>

Although it is difficult to completely identify the structure of the compound having a UV absorption in a spectral region of a decamer or higher isocyanate measured by gel permeation chromatography (GPC) in the present invention, the inventors of the present invention presumed that the compound has a 1-nylon structure represented by formula (15) as a main skeleton.

[Chemical formula 9]

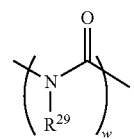

(15)

[In the formula, $R^{29}$ represents a residue obtained by removing one isocyanate group from an isocyanate compound and w represents an integer of 1 or more. Further, terminal groups are not described.]

$R^{29}$ in the above formula (15) represents a residue obtained by removing one isocyanate group from an isocyanate compound, and it may be a residue obtained by removing an isocyanate group from an isocyanate compound having an ethylenically unsaturated bond, and specifically, when the compound having an ethylenically unsaturated bond is a compound represented by the above formula (3), $R^{29}$ in the above formula (15) is represented by the following formula (8).

[Chemical formula 10]

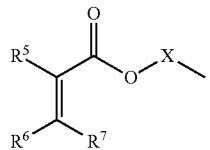

(8)

[In the formula, X, $R^5$, $R^6$, and $R^7$ each represents a group defined in the above formula (3).]

In addition, $R^{29}$ in the above formula (15), which is a residue obtained by removing one isocyanate group from an isocyanate compound, may also be a residue obtained by removing an isocyanate group from an isocyanate compound other than said isocyanate compound having an ethylenically unsaturated bond.

As the isocyanate compound in this case, for example, in the case of a bifunctional diisocyanate compound, a diisocyanate containing an aliphatic diisocyanate having 4 to 30 carbon atoms, an alicyclic diisocyanate having 8 to 30 carbon atoms, or an aromatic group having 8 to 30 carbon atoms may be preferably used, and specific examples thereof include aliphatic diisocyanates having 4 to 30 carbon atoms such as 1,4-tetramethylene diisocyanate, 1,5-pentamethylene diisocyanate, 1,4-diisocyanato-2-methylbutane, 1,6-hexamethylene diisocyanate, 1,6-diisocyanato-2,5-dimethylhexane, 2,2,4-trimethyl-1,6-hexamethylene diisocyanate, lysine methyl ester diisocyanate, lysine ethyl ester diisocyanate or the like; alicyclic diisocyanates having 8 to 30 carbon atoms such as isophorone diisocyanate, 1,3-bis (isocyanatomethyl)-cyclohexane, 4,4'-dicyclohexylmhnethane diisocyanate, hydrogenated tetramethylxylylene diisocyanate, norbornene diisocyanate or the like; diisocyanates containing an aromatic group having 8 to 30 carbon atoms such as 4,4'-diphenylmethane diisocyanate, 2,6-tolylene diisocyanate, xylylene diisocyanate, tetramethylxylylene diisocyanate, naphthalene diisocyanate or the like.

In addition, when a structural isomer exists in the above-mentioned compounds, the structural isomer is also included in the above examples. Also, examples of the trifunctional diisocyanate compound include 1,8-diisocyanate-4-isocyanate methyl octane, 1,3,6-triisocyanate hexane, 1,8-diisocyanato-4-(isocyanatomethyl)-2,4,7-trimethyloctane, 1,5-diisocyanato-3-(isocyanatomethyl) pentane, 1,6,11-triisocyanatoundecane, 1,4,7-triisocyanatoheptane, 1,2,2-triisocyanatobutane, 1,2,6-triisocyanatohexane, 1-isocyanato-2,2-bis (isocyanatomethyl) butane, 1,3,5-triisocyanatocyclohexane, 1,7-diisocyanato-4-(3-isocyanatopropyl) heptane, 1,3-diisocyanato-2-(isocyanatomethyl)-2-methylpropane, 1,3,5-triisocyanatobenzene, 1,3,5-triisocyanato-2-methylbenzene, 1,3,5-tris (1-isocyanatopropan-2-yl) benzene, 1,3,5-tris (1-isocyanatopropan-2-yl)-2-methylbenzene, 1,3,5-tris (1-isocyanatomethyl)-2-methylbenzene, 2,2'-((2-isocyanato-1,3-phenylene) bis (methylene)) bis (isocyanate benzene) and the like.

As mentioned above, the compound is defined by GPC measurement. Specifically, for example, in GPC with a developing solvent of tetrahydrofuran, when polystyrene is used as a standard substance of molecular weight, it is a peak having a UV absorption at a wavelength of 254 nm in the region of a decamer or higher isocyanate. In the spectrum measured by gel permeation chromatography (GPC), although it is difficult to directly measure the content of the compound having a UV absorption in the region of a decamer or higher isocyanate contained in the composition, for example, it may be obtained in a manner providing a UV detector and a differential refractive index detector in the GPC (it may be connected in parallel or connected in series), and determining a value calculated by (B)/(A) as the concentration of the compound having a UV absorption in the region of a decamer or higher isocyanate in the spectrum measured by gel permeation chromatography, (A) being an area of a peak corresponding to a bifunctional or higher functional isocyanate at a differential refractive index, and (B) being an area of the peak corresponding to the compound having a UV absorption (wavelength 254 nm) in the region of 10 or more isocyanate in the measurement spectrum by gel permeation chromatography.

<Compound Containing Isocyanurate Group and/or Biuret Group>

The compound containing an isocyanurate group and/or a biuret group is a compound containing a group represented by the following formula (6') or formula (7').

[Chemical formula 11]

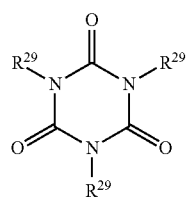

(6')

[Chemical formula 12]

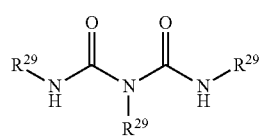

(7')

In the above formula, $R^{29}$ represents a residue obtained by removing one isocyanate group from a bifunctional or higher functional isocyanate compound.

The isocyanate constituting the compound having an isocyanurate group and/or a biuret group may be an isocyanate represented by the above formula (6') or formula (7'), or may also be another isocyanate, and preferably, an isocyanate other than the isocyanate represented by the above formula (6') or formula (7'). Even in the case of the isocyanate other than the isocyanate represented by formula (6') or formula (7'), the compounds mentioned in the section of <compound having a UV absorption in a spectral region of a decamer or higher isocyanate measured by gel permeation chromatography> may be preferably used.

A amount of the compound containing an isocyanurate group or a biuret group in the isocyanate composition may be quantified by an added amount of the compound containing an isocyanurate group and/or a biuret group, or may be quantified by GPC using tetrahydrofuran as a developing solvent. Specifically, in the method of quantifying by GPC, the amount can be obtained in such a manner that a differential refractive index detector is provided in GPC, and with a differential refractive index, a ratio of (B)/(A) is calculated using a peak area (A) corresponding to the isocyanate compound represented by the above formula (6') or formula (7') and a peak area (B) corresponding to the compound containing an isocyanurate group and/or a biuret group.

<Compound Having an Unsaturated Bond Other than an Unsaturated Bond Constituting an Aromatic Ring>

The isocyanate composition of the present invention includes the isocyanate having an ethylenically unsaturated bond together with a compound other than the isocyanate having an ethylenically unsaturated bond and having at least one unsaturated bond other than an unsaturated bond constituting an aromatic ring and/or an inert compound to be described later. In addition, the compound having an unsaturated bond other than an unsaturated bond constituting an aromatic ring as referred to herein is not the compound represented by formula (1) as defined above, or a compound having a UV absorption in a spectral region of a decamer or higher isocyanate measured by gel permeation chromatography, or a compound having an isocyanurate group and/or a biuret group.

The compound having an unsaturated bond other than an unsaturated bond constituting an aromatic ring according to the present invention (hereinafter, may also referred to as "unsaturated bond compound") is a compound having at least one unsaturated bond other than an unsaturated bond constituting an aromatic ring, and the unsaturated bond is preferably an unsaturated bond between carbon and oxygen.

As such a compound, for example, a carbonic acid derivative can be mentioned.

(Carbonic Acid Derivative)

In the present invention, the carbonic acid derivative refers to a compound represented by the following formula (4).

[Chemical formula 13]

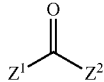

(4)

[In the formula, each of $Z^1$ and $Z^2$ independently represents a residue obtained by removing a hydrogen atom from a hydroxy compound, or an amino group which may be substituted with an organic group.]

Examples of the compound represented by the above formula (4) include a urea compound, an N-unsubstituted carbamic acid ester, a carbonic acid ester, and an N-substituted carbamic acid ester.

<<Urea Compound>>

The urea compound is a compound having at least one urea bond in the molecule. The urea compound used in the isocyanate composition of the present invention is preferably a compound having one urea bond, and is represented by the following formula (5).

[Chemical formula 14]

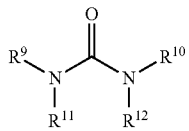

(5)

[In the formula, each of $R^9$, $R^{10}$, $R^{11}$ and $R^{12}$ independently represents an aliphatic group having 1 to 20 carbon atoms, an aliphatic group having 7 to 20 carbon atoms and substituted with an aromatic compound, an aromatic group having 6 to 20 carbon atoms or a hydrogen atom, a total number of carbon atoms constituting $R^9$ and $R^{11}$ is an integer of 0 to 20, and a total number of carbon atoms constituting $R^{10}$ and $R^{12}$ is an integer of 0 to 20.]

Examples of $R^9$, $R^{10}$, $R^{11}$ and $R^{12}$ include hydrogen atom; chain alkyl groups such as methyl group, ethyl group, propyl group, butyl group, pentyl group, hexyl group, heptyl group, octyl group, nonyl group, silyl group, undecyl group, dodecyl group, tridecyl group, tetradecyl group, pentadecyl group, hexadecyl group, heptadecyl group, octadecyl group, nonadecyl group or the like; aromatic groups having 6 to 20 carbon atoms such as phenyl group, methylphenyl group, ethyl phenyl group, propylphenyl group, butylphenyl group, pentylphenyl group, hexylphenyl group, heptylphenyl group, octylphenyl group, nonylphenyl group, decylphenyl group, biphenyl group, dimethylphenyl group, diethylphenyl group, dipropylphenyl group, dibutylphenyl group, dipentylphenyl group, dihexylphenyl group, diheptylphenyl group, terphenyl group, trimethylphenyl group, triethylphenyl group, tripropylphenyl group, tributylphenyl group or the like; aralkyl groups having 7 to 20 carbon atoms such as phenylmethyl group, phenylethyl group, phenylpropyl group, phenyl butyl group, phenylpentyl group, phenylhexyl group, phenyl heptyl group, phenyl octyl group, phenyl nonyl group or the like.

Examples of the urea compound represented by formula (5) include urea, methylurea, ethylurea, propyl urea, butyl urea, pentyl urea, hexyl urea, heptyl urea, octyl urea, nonyl urea, decyl urea, undecyl urea, dodecyl urea, tridecyl urea, tetradecyl urea, pentadecyl urea, hexadecyl urea, heptadecyl urea, octadecyl urea, nonadecyl urea, phenyl urea, N-(methylphenyl) urea, N-(ethylphenyl) urea, N-(propylphenyl) urea, N-(butylphenyl) urea, N-(pentylphenyl) urea, N-(hexylphenyl) urea, N-(heptylphenyl) urea, N-(octylphenyl) urea, N-(nonylphenyl) urea, N-(decylphenyl) urea, N-biphenyl urea, N-(dimethylphenyl) urea, N-(diethylphenyl) urea, N-(dipropylphenyl) urea, N-(dibutylphenyl) urea, N-(dipentylphenyl) urea, N-(dihexylphenyl) urea, N-(diheptylphenyl) urea, N-terphenylurea, N-(trimethylphenyl) urea, N-(triethylphenyl) urea, N-(tripropylphenyl) urea, N-(tributylphenyl) urea, N-(phenylmethyl) urea, N-(phenylethyl) urea, N-(phenylpropyl) urea, N-(phenylbutyl) urea, N-(phenylpentyl) urea, N-(phenylhexyl) urea, N-(phenylheptyl) urea, N-(phenyloctyl) urea, N-(phenylnonyl) urea, dimethyl urea, diethyl urea, dipropyl urea, dibutyl urea, dipentyl urea, dihexyl urea, diheptyl urea, dioctyl urea, dinonylurea, didecyl urea, diundecyl urea, didodecylurea, ditridecyl urea, ditetradecyl urea, dipentadecyl urea, dihexadecyl urea, diheptadecyl urea, dioctadecyl urea, zinonadecyl, diphenyl urea, di (methylphenyl) urea, di (ethylphenyl) urea, di (propylphenyl) urea, di (butylphenyl) urea, di (pentylphenyl) urea, di (hexylphenyl) urea, di (heptylphenyl) urea, di (octylphenyl) urea, di (nonylphenyl) urea, di (decylphenyl) urea, di (biphenyl) urea, di (dimethylphenyl) urea, di (diethylphenyl) urea, di (dipropylphenyl) urea, di (dibutylphenyl) urea, di (dipentylphenyl) urea, di (dihexylphenyl) urea, di (diheptylphenyl) urea, di (terphenyl) urea, di (trimethylphenyl) urea, di (triethylphenyl) urea, di (tripropylphenyl) urea, di (tributylphenyl) urea, di (phenylmethyl) urea, di (phenylethyl) urea, di (phenylpropyl) urea, di (phenylbutyl) urea, di (phenylpentyl) urea, di (phenylhexyl) urea, di (phenylheptyl) urea, di (phenyloctyl) urea, di (phenylnonyl) urea and the like.

Among the examples, a urea represented by the above formula (5) in which $R^9$, $R^{10}$, $R^{11}$ and $R^{12}$ are a hydrogen atom is preferable.

<<N-Unsubstituted Carbamic Acid Ester>>

In the present invention, as the N-unsubstituted carbamic acid ester, a compound represented by the following formula (6) is preferably used.

[Chemical formula 15]

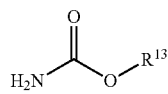

(6)

[In the formula, $R^{13}$ represents an aliphatic group having 1 to 20 carbon atoms, an aliphatic group having 7 to 20 carbon atoms and substituted with an aromatic group, or an aromatic group having 6 to 20 carbon atoms.]

As examples of the aliphatic group for $R^{13}$, a chain hydrocarbon group, a cyclic hydrocarbon group, and a group composed of a chain hydrocarbon group and a cyclic hydrocarbon group, these groups not containing an active hydrogen, can be mentioned. The aliphatic group for $R^{13}$ may contain an atom other than a carbon atom and hydrogen atom, and the atom is preferably a specific nonmetallic atom (for example, oxygen, nitrogen, sulfur, silicon or halogen atom). The aliphatic group for $R^{13}$ is preferably an aliphatic group containing an oxygen atom as an atom other than carbon and hydrogen atoms, or an aliphatic group not containing an atom other than carbon and hydrogen atoms.

Examples of the aliphatic group substituted with an aromatic group for $R^{13}$ include a chain or branched chain alkyl group having 1 to 14 carbon atoms and substituted with an aromatic group having 6 to 19 carbon atoms. The aliphatic group substituted with an aromatic group may contain an atom other than carbon and hydrogen atoms. The chain or branched chain alkyl group is a group not containing an active hydrogen and it may contain an atom other than carbon and hydrogen atoms, and the atom preferably a specific nonmetallic atom (oxygen, nitrogen, sulfur, silicon or halogen atom). Examples of the aromatic group include a monocyclic aromatic group, a condensed polycyclic aromatic group, a crosslinked cyclic aromatic group, a ring-assembled aromatic group, a heterocyclic aromatic group and the like, these groups not containing an active hydrogen. The aromatic group may contain an atom other than carbon and hydrogen atoms, and the atom is preferably a specific nonmetallic atom (oxygen, nitrogen, sulfur, silicon or halogen atom). The aromatic group is preferably a substituted or unsubstituted phenyl group, a substituted or unsubstituted naphthyl group, or a substituted or unsubstituted anthryl group. The aliphatic group and the aromatic group are preferably a group containing an oxygen atom as the atom other than carbon and oxygen atoms, or a hydrocarbon group not containing an atom other than carbon and hydrogen atoms.

As examples of the aromatic group for $R^{13}$, a monocyclic aromatic group, a condensed polycyclic aromatic group, a crosslinked cyclic aromatic group, a ring-assembled aromatic group, a heterocyclic aromatic group and the like, these groups not containing an active hydrogen, can be mentioned. When the aromatic group contains an atom other than carbon and hydrogen atoms, the atom may be a specific nonmetallic atom (oxygen, nitrogen, sulfur, silicon or halogen atom). The aromatic group is preferably a substituted or unsubstituted phenyl group, a substituted or unsubstituted naphthyl group, or a substituted or unsubstituted anthryl group. Examples of the substituent include a hydrogen atom, an aliphatic group (a chain hydrocarbon group, a cyclic hydrocarbon group, a group composed of a chain hydrocarbon group and a cyclic hydrocarbon group), and a group composed of an aliphatic group and an aromatic group. The aromatic group is preferably a group containing an oxygen atom as the atom other than carbon and oxygen, or a hydrocarbon group not containing an atom other than carbon and hydrogen atoms.

Specific examples of $R^{13}$ include chain alkyl groups having 1 to 50 carbon atoms such as methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl, eicosyl group or the like; aromatic groups having 6 to 50 carbon atoms such as phenyl group, methylphenyl group, ethyl phenyl group, propylphenyl group, butylphenyl group, pentylphenyl group, hexylphenyl group, heptylphenyl group, octylphenyl group, nonylphenyl group, decylphenyl group, biphenyl group, dimethylphenyl group, diethylphenyl group, dipropylphenyl group, dibutylphenyl group, dipentylphenyl group, dihexylphenyl group, diheptylphenyl group, terphenyl group, trimethylphenyl group, triethylphenyl group, tripropylphenyl group, tributylphenyl group or the like; aralkyl groups having 7 to 50 carbon atoms such as phenylmethyl group, phenylethyl group, phenylpropyl group, phenyl butyl group, phenyl pentyl group, phenylhexyl group, phenyl heptyl group, phenyl octyl group, phenyl nonyl group or the like, and the like.

Specific examples of N-unsubstituted carbamic acid ester represented by the above formula (6) include methyl carbamate, ethyl carbamate, carbamate propyl, butyl carbamate, pentyl carbamate, hexyl carbamate, heptyl carbamate, octyl carbamate, nonyl carbamate, decyl carbamate, carbamate undecyl, dodecyl carbamate, tridecyl carbamate, tetradecyl carbamate, pentadecyl carbamate, hexadecyl carbamate, heptadecyl carbamate, octadecyl carbamate, carbamate nonadecyl, carbamate phenyl, carbamic acid (methylphenyl), carbamic acid (ethylphenyl), carbamic acid (propylphenyl), carbamic acid (butylphenyl), carbamic acid (pentylphenyl), carbamic acid (hexylphenyl), acid (octylphenyl), carbamic acid (nonylphenyl), carbamic acid (decylphenyl), carbamic acid (biphenyl), carbamic acid (dimethylphenyl), carbamic acid (diethylphenyl), carbamic acid (dipropylphenyl), carbamic acid (dibutylphenyl), carbamic acid (dipentylphenyl), carbamic acid (dihexylphenyl), carbamic acid (diheptylphenyl), carbamic acid (terphenyl), carbamic acid (trimethylphenyl), carbamic acid (triethylphenyl), carbamic acid (tripropylphenyl), carbamic acid (tributylphenyl), carbamic acid (phenylmethyl), carbamic acid (phenylethyl), carbamic acid (phenylpropyl), carbamic acid (phenylbutyl), carbamic acid (phenyl pentyl), carbamic acid (phenylhexyl), carbamic acid (phenylheptyl), carbamic acid (phenyloctyl), arbamic acid (phenyl nonyl), structural isomers thereof, and the like.

<<Carbonic Acid Ester>>

In the present specification, the carbonic acid ester refers to a compound in which one or two hydrogen atoms of a carbonic acid $(CO(OH)_2)$ are substituted with an aliphatic group or an aromatic group. In the present invention, a compound represented by the following formula (7) is preferably used.

[Chemical formula 16]

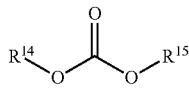

(7)

[In the formula, each of $R^{14}$ and $R^{15}$ independently represents an aliphatic group having 1 to 20 carbon atoms, an aliphatic group having 7 to 20 carbon atoms and substituted with an aromatic group, an aromatic group having 6 to 20 carbon atoms.]

Examples of $R^{14}$ and $R^{15}$ include the same groups as $R^{13}$ in the above-described formula (6).

Specific examples of the carbonic ester include dimethyl carbonate, diethyl carbonate, dipropyl carbonate, dibutyl carbonate, dipentyl carbonate, dihexyl carbonate, diheptyl carbonate, dioctyl carbonate, dinonyl carbonate, didecyl carbonate, zinc diesyl carbonate, didodecyl carbonate, ditridecyl carbonate, ditetradecyl carbonate, dipentadecyl carbonate, dihexadecyl carbonate, diheptadecyl carbonate, dioctadecyl carbonate, dinonadecyl carbonate, diphenyl carbonate, di (methylphenyl) carbonate, di (ethylphenyl) carbonate, di (propylphenyl) carbonate, di (butylphenyl) carbonate, di (carbonylphenyl) carbonate, di (hexylphenyl) carbonate, di (heptylphenyl) carbonate, di (octylphenyl) carbonate, di (nonylphenyl) carbonate, di (decylphenyl) carbonate, Di (biphenyl) carbonate, di (dimethylphenyl) carbonate, di (diethylphenyl) carbonate, di (dipropylphenyl) carbonate, di (dibutylphenyl) carbonate, di (dipentylphenyl) carbonate, di (dihexylphenyl) carbonate, di (diheptylphenyl) carbonate, di (phenylphenyl) carbonate, di (trimethylphenyl) carbonate, di (triethylphenyl) carbonate, di (tripropylphenyl) carbonate, di (tributylphenyl) carbonate, di (phenylmethyl) carbonate, di (phenylethyl) carbonate, di (phenylpropyl) carbonate, di (phenylbutyl) carbonate, di (phenylpentyl) carbonate, di (phenylhexyl) carbonate, Di (phenylheptyl) carbonate, di (phenyloctyl) carbonate, di (phenylnonyl) carbonate, structural isomers thereof and the like.

<<N-Substituted Carbamic Acid Ester>>

As the N-substituted carbamic acid ester, a compound represented by the following formula (1) can be mentioned.

[Chemical formula 17]

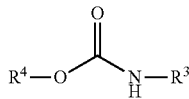

(2)

(In the formula, $R^3$ represents a residue obtained by removing an isocyanate group from an isocyanate compound having an ethylenically unsaturated bond, and $R^4$ represents an organic group.)

$R^3$ is a residue obtained by removing an isocyanate group (—NCO) from an isocyanate compound having an ethylenically unsaturated bond, and is an organic group having an ethylenically unsaturated bond.

The compound represented by formula (2) can be produced by reacting an isocyanate compound having an ethylenically unsaturated bond with a hydroxy compound. For example, the compound represented by formula (2) can be produced by mixing an isocyanate compound having an ethylenically unsaturated bond with a hydroxy compound at a stoichiometric ratio of 1 or less with respect to the isocyanate group of the isocyanate compound having an ethylenically unsaturated bond, and it can be used for preparing the composition of the present invention without purifying or the like.

Therefore, when the compound represented by formula (2) is produced by the reaction of an isocyanate compound having an ethylenically unsaturated bond with a hydroxy compound, and the compound represented by formula (3) is used as the isocyanate compound having an ethylenically unsaturated bond in the present invention, $R^3$ in formula (2) is a group represented by the following formula (8).

[Chemical formula 18]

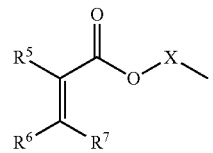

(8)

[In the formula, X represents an organic group, and $R^5$, $R^6$, and $R^7R^5$, $R^6$, and $R^7$ represent a group defined in the above formula (3).]

$R^4$ can be represented as a residue derived from a hydroxy compound and obtained by removing a hydroxy group (—OH) constituting the hydroxy compound. Hereinafter, in order to simplify the explanation of $R^4$, $R^4$ is defined as a hydroxy compound ($R^4$OH) in which a hydroxy group is added to $R^4$. The hydroxy compound $R^4$OH defined here also represents $R^4$ in the above formula (2) and $R^2$ in the above formula (16).

The hydroxy compound ($R^4$OH) may be an alcohol or an aromatic hydroxy compound.

When the hydroxy compound ($R^4$OH) is an alcohol, it is a compound represented by the following formula (9).

[Chemical formula 19]

  (9)

[In the formula, $R^{16}$ represents an aliphatic group having 1 to 20 carbon atoms or an aliphatic group having 7 to 20 carbon atoms to which an aromatic group is bonded, the groups being substituted with "s" number of hydroxy groups, and s represents an integer of 1 to 3. However, $R^{16}$ is a group not having an active hydrogen other than the hydroxyl group.]

Examples of the aliphatic group for $R^{16}$ include a chain hydrocarbon group, a cyclic hydrocarbon group, and a group in which a chain hydrocarbon group and a cyclic hydrocarbon group are bonded (for example, a cyclic hydrocarbon group substituted with a chain hydrocarbon group, a chain hydrocarbon group substituted with a cyclic hydrocarbon group, and the like). The aliphatic group for $R^{16}$ may contain an atom other than carbon and hydrogen atoms, and the atom is preferably a specific nonmetallic atom (oxygen, nitrogen, sulfur, silicon or halogen atom). The aliphatic group for $R^{16}$ is preferably an aliphatic group containing an oxygen atom as the atom other than carbon and hydrogen atoms, or an aliphatic group not containing and atom other than carbon and atoms.

Examples of the aliphatic group to which an aromatic group is bonded include an alkyl group and a cycloalkyl group to which an aromatic group having 6 to 12 carbon atoms is bonded. Examples of the aromatic group bonded to the aliphatic group include a monocyclic aromatic group, a condensed polycyclic aromatic group, a crosslinked cyclic aromatic group, a ring-assembled aromatic group, a heterocyclic aromatic group and the like. Among the examples, a substituted or unsubstituted phenyl group, a substituted or unsubstituted naphthyl group, or a substituted or unsubstituted anthryl group is preferable. The aromatic group may have an atom other than carbon and hydrogen atoms, and the atom is preferably a specific nonmetallic atom (oxygen, nitrogen, sulfur, silicon, or halogen atom).

Examples of $R^{16}$ include chain alkyl groups such as methyl group, ethyl group, propyl group, butyl group, pentyl group, hexyl group, heptyl group, octyl group, nonyl group, decyl group, dodecyl group, octadecyl group or structural isomers thereof, or the like; cycloalkyl groups such as cyclopentyl group, cyclohexyl group, cycloheptyl group, cyclooctyl group or structural isomers thereof, or the like; groups constituted of a chain alkyl group and a cycloalkyl group such as methylcyclopentyl group, ethylcyclopentyl group, ethylcyclohexyl group, ethylcyclohexyl group, propylcyclohexyl group, butylcyclohexyl group, pentylcyclohexyl group, hexylcyclohexyl group, dimethylcyclohexyl group, diethyl cyclohexyl group, dibutyl cyclohexyl group or structural isomers thereof, or the like; aralkyl groups such as phenylmethyl group, phenylethyl group, phenylpropyl group, phenylbutyl group, phenylpentyl group, phenylhexyl group, phenylheptyl group, phenyloctyl group, phenyl nonyl group or structural isomers thereof, or the like; and the like.

When preparing the compound of formula (1) using these alcohols, from the viewpoint of industrial use, it is preferable to use an alcohol having one or two alcoholic hydroxy groups (a hydroxy group constituting the hydroxy compound and directly bonded to a carbon atom other than the carbon atoms constituting the aromatic ring) because of its low viscosity, and more preferable to use a monoalcohol having one alcoholic hydroxyl group described above.

Specific examples of the alcohol include the compounds exemplified in [0069] of WO 2014/069605 pamphlet as alcohols.

Specifically, unsubstituted alkyl alcohols such as methyl alcohol, ethyl alcohol, propyl alcohol, butyl alcohol, pentyl alcohol, hexyl alcohol, heptyl alcohol, octyl alcohol, nonyl alcohol, decyl alcohol, dodecyl alcohol, octadecyl alcohol and structural isomers thereof, or the like; unsubstituted cycloalkyl alcohols such as cyclopentyl alcohol, cyclohexyl alcohol, cycloheptyl alcohol, cyclooctyl alcohol and structural isomers thereof, or the like; alcohols composed of a chain alkyl group and a cycloalkyl alcohol such as methyl cyclopentyl alcohol, ethyl cyclopentyl alcohol, methyl cyclohexyl alcohol, ethyl cyclohexyl alcohol, propyl cyclohexyl alcohol, butyl cyclohexyl alcohol, pentyl cyclohexyl alcohol, hexyl cyclohexyl alcohol, dimethyl cyclohexyl alcohol, diethyl cyclohexyl alcohol, dibutyl cyclohexyl alcohol and structural isomers thereof, or the like; aromatic group-substituted alkyl alcohols such as phenyl methyl alcohol, phenylethyl alcohol, phenyl propyl alcohol, phenylbutyl alcohol, phenyl pentyl alcohol, phenylhexyl alcohol, phenyl heptyl alcohol, phenyl octyl alcohol, phenyl nonyl alcohol and structural isomers thereof, or the like; and the like can be mentioned.

Among the examples, alkyl alcohols having 1 to 20 carbon atoms are preferably used from the viewpoints of ease of availability, solubility of raw materials and products, and the like.

In the case where the hydroxy compound ($R^4OH$) is an aromatic hydroxy compound, from the viewpoint that it can be used industrially and generally has a low viscosity, a mono- to tri-valent aromatic hydroxy compound (that is, the number of hydroxy groups bonded to the aromatic ring is an integer of 1 to 3) is preferred. As the aromatic hydroxy compound, for example, a compound represented by the following formula (10) can be mentioned.

[Chemical formula 20]

[In the formula, ring A represents an optionally substituted aromatic hydrocarbon ring, and ring A may be monocyclic or polycyclic. t represents an integer of 1 to 3.]

In the above formula (10), t is preferably 1.

The substituent that ring A may have includes a halogen atom, an aliphatic group, and an aromatic group. Examples of the substituent include a cyclic hydrocarbon group (a monocyclic hydrocarbon group, a condensed polycyclic hydrocarbon group, a crosslinked cyclic hydrocarbon group, a spiro hydrocarbon group, a ring-assembled hydrocarbon group, a cyclic hydrocarbon group having a side chain), a cyclic group such as a heterocyclic group, a heterocyclic spiro group, a hetero-crosslinked cyclic group or the like, an acyclic hydrocarbon group, and a group in which one or more acyclic hydrocarbon groups and one or more cyclic groups are bonded.

Among these substituents, considering the difficulty of side reactions, the substituent which can be preferably used in the present invention is a group selected from the group consisting of an acyclic hydrocarbon group and a cyclic hydrocarbon group (a monocyclic hydrocarbon group, a fused polycyclic hydrocarbon group, a crosslinked cyclic hydrocarbon group, a spiro hydrocarbon group, a ring-assembled hydrocarbon group, a cyclic hydrocarbon group having a side chain), and a group in which at least two groups selected from the above group are bonded to each other (groups substituted with each other).

Preferable examples of the substituent for substituting ring A include a group selected from the group consisting of an alkyl group, a cycloalkyl group, an aryl group, an aralkyl group, an ether group (for example, a substituted or unsubstituted alkyl ether group, aryl ether group or aralkyl ether group), a group in which two or more groups selected from the above group are bonded to each other; a group in which two or more groups selected from the above group are connected by a saturated hydrocarbon bond or an ether bond, a group which is a halogen atom and the total number of the carbon atoms constituting ring A and the carbon atoms constituting all of the substituents substituting ring A is an integer of 6 to 50.

Examples of the ring A include a benzene ring, naphthalene ring, anthracene ring, phenanthrene ring, naphthacene ring, chrysene ring, pyrene ring, triphenylene ring, pentalene ring, azulene ring, heptalene ring, indacene ring, biphenylene ring, acenaphthylene ring, aceanthrylene ring, acephenanthrylene ring and the like. The ring A preferably contains at least one structure selected from benzene rings and naphthalene rings.

In the case of producing the compound of formula (1) using these aromatic hydroxy compounds, from the viewpoint of industrial use, an aromatic hydroxy compound having a benzene ring skeleton which is easy to obtain is preferable. As such an aromatic hydroxy compound, an aromatic hydroxy compound represented by the following formula (17) can be mentioned.

[Chemical formula 21]

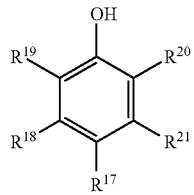

(17)

[In the formula, each of $R^{17}$, $R^{18}$, $R^{19}$, $R^{20}$ and $R^{21}$ independently represents a group selected from the group consisting of a chain alkyl group, a cycloalkyl group, an aryl group, a chain alkyl group to which an aromatic group is bonded, a cycloalkyl to which an aromatic group is bonded, and an ether group (a substituted or unsubstituted alkyl ether, aryl ether or alkyl ether to which an aromatic group is bonded); a group in which two or more groups selected from the above group are bonded to each other; a group in which two or more groups selected from the above group are connected by a saturated aliphatic bond or an ether bond; a halogen atom; or a hydrogen atom; the total number of carbon atoms constituting $R^{17}$ to $R^{21}$ is an integer of 0 to 44.]

In the above formula (17), each of $R^{17}$ to $R^{21}$ is preferably independently selected from the groups shown in the following (i) to (v).

(i) A hydrogen atom, (ii) a halogen atom, (iii) a carbon functional group having 1 to 44 carbon atoms, in which one or more groups selected from the group consisting of a chain alkyl group having 1 to 43 carbon atoms, a cycloalkyl group having 1 to 43 carbon atoms, an alkoxy group having 1 to 43 carbon atoms, a polyoxyalkylene alkyl ether group having 2 to 43 carbon atoms and having no a terminal hydroxyl group, an aryl group having 6 to 43 carbon atoms, an alkyl group having 7 to 43 carbon atoms to which an aromatic group is bonded, a cycloalkyl group having 7 to 43 carbon atoms to which an aromatic group is bonded, and an alkyloxy group to which an aromatic group having 7 to 43 carbon atoms is bonded, are each independently bonded to an α-position carbon atom, (iv) an aromatic group having 1 to 44 carbon atoms in which one or more groups selected from the group consisting of a hydrogen atom, a chain alkyl group having 1 to 38 carbon atoms, a cycloalkyl group having 4 to 38 carbon atoms, an alkoxy group having 1 to 38 carbon atoms, a polyoxyalkylene alkyl ether group having 2 to 38 carbon atoms and having no a terminal hydroxyl group, an aromatic group having 6 to 38 carbon atoms, an alkyl group having 7 to 38 carbon atoms to which an aromatic group is bonded, a cycloalkyl group having 7 to 38 carbon atoms to which an aromatic group is bonded, and an alkyloxy group having 7 to 38 carbon atoms to which an aromatic group is bonded, are each independently bonded to the carbon atoms constituting the aromatic ring, (v) an oxygen functional group having 1 to 44 carbon atoms, in which one or more groups selected from the group consisting of an alkyl group having 1 to 44 carbon atoms, a cycloalkyl group having 1 to 44 carbon atoms, an alkoxy group having 1 to 44 carbon atoms, a polyoxyalkylene alkyl ether group having 2 to 44 carbon atoms and having no a terminal hydroxyl group, an aromatic group having 6 to 44 carbon atoms, an alkyl group having 7 to 44 carbon atoms to which an aromatic group is bonded, and an aralkyloxy group having 7 to 44 carbon atoms, are bonded to an oxygen atom.

Here, the "aralkyloxy group" represents a group in which an oxygen atom is bonded to the above-defined aralkyl group.

Specific examples of $R^{17}$ to $R^{21}$ include chain alkyl groups such as a methyl group, ethyl group, propyl group, butyl group, pentyl group, hexyl group, heptyl group, octyl group, nonyl group, decyl group, dodecyl group, octadecyl group and structural isomers thereof, or the like; cycloalkyl groups such as a cyclopentyl group, cyclohexyl group, cycloheptyl group, cyclooctyl group or the like; groups composed of a chain alkyl group and a cycloalkyl group such as a methyl cyclopentyl group, ethyl cyclopentyl group, methylcyclohexyl group, ethyl cyclohexyl group, propylcyclohexyl group, butyl cyclohexyl group, pentylcyclohexyl group, hexyl cyclohexyl group, dimethyl cyclohexyl group, diethyl cyclohexyl group, dibutyl cyclohexyl group and structural isomers thereof, or the like; chain alkyloxy groups such as a methoxy group, ethoxy group, propoxy group, butyloxy group, pentyloxy group, hexyloxy group, heptyloxy group, octyloxy group, nonyloxy group, decyloxy group, dodecyloxy group, octadecyloxy group and structural isomers thereof, or the like; cycloalkyloxy groups such as a cyclopentyloxy group, cyclohexyloxy group, cycloheptyloxy group, cyclooctyloxy group or the like; alkyloxy groups corresponding to a group composed of a chain alkyl group and a cycloalkyl group such as a methylcyclopentyloxy group, ethyl cyclopentyloxy group, methylcyclohexyloxy group, ethyl cyclohexyloxy group, propylcyclohexyloxy group, butyl cyclohexyloxy group, pentylcyclohexyloxy group, hexyl cyclohexyloxy group, dimethylcyclohexyloxy group, diethyl cyclohexyloxy group, dibutylcyclohexyloxy group and structural isomers thereof, or the like; aromatic groups such as a phenyl group, methylphenyl group, ethyl phenyl group, propylphenyl group, butylphenyl group, pentylphenyl group, hexylphenyl group, heptylphenyl group, octylphenyl group, nonylphenyl group, decylphenyl group, biphenyl group, dimethylphenyl group, diethylphenyl group, dipropylphenyl group, dibutylphenyl group, dipentylphenyl group, dihexylphenyl group, diheptylphenyl group, terphenyl group, trimethylphenyl group, triethylphenyl group, tripropylphenyl group, tributylphenyl group and structural isomers thereof, or the like; groups composed of an aromatic group and an alkyl group such as 1-methyl-1-phenylethyl group, 1-phenylethyl group or the like; aromatic oxy groups such as a phenoxy group, methylphenoxy group, ethylphenoxy group, propylphenoxy group, butylphenoxy group, pentylphenoxy group, hexylphenoxy group, heptylphenoxy group, octylphenoxy group, nonylphenoxy group, decylphenoxy group, phenylphenoxy group, dimethylphenoxy group, diethylphenoxy group, dipropylphenoxy group, dibutylphenoxy group, dipentylphenoxy group, dihexylphenoxy group, diheptylphenoxy group, diphenylphenoxy group, trimethylphenoxy group, triethylphenoxy group, tripropylphenoxy group, tributylphenoxy group and structural isomers thereof, or the like; aralkyl groups such as a phenylmethyl group, phenylethyl group, phenylpropyl group, phenyl butyl group, phenyl pentyl group, phenylhexyl group, phenyl heptyl group, phenyl octyl group, phenyl nonyl group or the like; aralkyloxy groups such as a phenylmethoxy group, phenylethoxy group, phenylpropyloxy group, phenylbutyloxy group, phenyl pentyloxy group, phenylhexyloxy group, phenylheptyloxy group, phenyl octyloxy group, phenyl nonyloxy group and structural isomers thereof, or the like; and the like.

<Inactive Compound>

The isocyanate composition of the present invention includes at least one compound (hereinafter, may also referred to as "inactive compound") selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound. In the present specification, the "inert compound" means a compound which does not react with the isocyanate compound during the storage of the isocyanate composition and during the formation reaction of polyurethane.

The inactive compounds are classified into the following compounds A to G. The hydrocarbon compound is classified into compound A and compound B, the ether compound and the sulfide compound are classified into compounds C to E, the halogenated hydrocarbon compound is classified into the following compound F, the silicon-containing hydrocarbon compound, the silicon-containing ether compound and the silicon-containing sulfide compound are classified into the following compound G, respectively. In addition, compounds A to G listed herein do not contain an unsaturated bond other than an aromatic ring, and the above-mentioned "compound represented by formula (1)", "compound having a UV absorption in a spectral region of a decamer or higher isocyanate measured by gel permeation chromatography", "compound having an isocyanurate group and/or a biuret group", and "unsaturated bond compound" are not included.

(Compound A)

Compound A is an aliphatic hydrocarbon compound having a linear, branched or cyclic structure. Compound A is preferably a hydrocarbon compound having 5 to 20 carbon atoms. Specific examples of compound A include a pentane, hexane, heptane, octane, nonane, decane, dodecane, tetradecane, pentadecane, hexadecane, octadecane, nonadecane, cyclopentane, cyclohexane, cycloheptane, cyclooctane, methylcyclopentane, ethylcyclopentane, methyl cyclohexane, ethyl cyclohexane, propylcyclohexane, butyl cyclohexane, pentylcyclohexane, hexyl cyclohexane, dimethyl cyclohexane, diethyl cyclohexane, dibutylcyclohexane, and structural isomers thereof, and the like.

(Compound B)

Compound B is an aromatic hydrocarbon compound which may be substituted with an aliphatic hydrocarbon group. Compound B is preferably a hydrocarbon compound having 5 to 20 carbon atoms. Specific examples of the compound B include a benzene, toluene, ethylbenzene, butylbenzene, pentylbenzene, hexylbenzene, octyl benzene, biphenyl, terphenyl, diphenylethane, (Methylphenyl) phenylethane, dimethylbiphenyl, benzyl toluene, naphthalene, methyl naphthalene, ethyl naphthalene, butyl naphthalene and structural isomers thereof, and the like.

(Compound C)

Compound C is a compound having an ether bond or a sulfide bond, and an aliphatic hydrocarbon group; and is a compound in which the same or different aliphatic hydrocarbon compounds are bonded via an ether bond or a sulfide bond. Compound C is preferably a compound having 2 to 20 carbon atoms. Specific examples of compound C include ethers in which hydrocarbon compounds are bonded via an ether bond such as an ethyl ether, butyl ether, octyl ether, nonyl ether, decyl ether, methyl ethyl ether, methyl butyl ether, methyl octyl ether, methyl nonyl ether, methyl decyl ether, ethyl butyl ether, ethyl octyl ether, ethyl nonyl ether, ethyl decyl ether, butyl octyl ether, butyl nonyl ether, butyl decyl ether, octyl nonyl ether, octyl decyl ether, dicyclopentyl ether, dicyclohexyl ether, dicyclooctyl ether, cyclohexylethyl ether, cyclohexyl butyl ether, cyclohexyl octyl ether, cyclohexyl nonyl ether, cyclohexyl decyl ether, tetraethylene glycol dimethyl ether and structural isomers thereof, or the like; sulfides in which hydrocarbon compounds are bonded via a sulfide bond such as an ethyl sulfide, butyl sulfide, octyl sulfide, nonyl sulfide, decyl sulfide, methyl ethyl sulfide, methyl butyl sulfide, methyl octyl sulfide, methyl nonyl sulfide, methyl decyl sulfide, ethyl butyl sulfide, ethyl octyl sulfide, ethyl nonyl sulfide, ethyl decyl sulfide, butyl octyl sulfide, butyl nonyl sulfide, butyl decyl sulfide, octyl nonyl sulfide, octyl decyl sulfide, dicyclopentyl sulfide, dicyclohexyl sulfide, dicyclooctyl sulfide, cyclohexylethyl sulfide, cyclohexyl butyl sulfide, cyclohexyl octyl sulfide, cyclohexyl nonyl sulfide, cyclohexyl decyl sulfide and structural isomers thereof, or the like; and the like.

(Compound D)

Compound D is a compound having an ether bond or a sulfide bond, and an aromatic hydrocarbon group and is a compound in which the same or different aromatic hydrocarbon compounds are bonded via an ether bond or a sulfide bond. Compound D is preferably a compound having 2 to 20 carbon atoms. Specific examples of compound D include aromatic ethers in which aromatic hydrocarbon compounds are bonded via an ether bond such as a diphenyl ether, (methylphenyl)-phenyl ether, (ethylphenyl)-phenyl ether, (butylphenyl)-phenyl ether, (hexylphenyl)-phenyl ether, (methylphenyl) ether, (ethylphenyl) ether, (butylphenyl) ether, (hexylphenyl) ether, dibenzyl ether, di (methylbenzyl) ether, di (ethylbenzyl) ether, di (butylbenzyl) ether, di (pentylbenzyl) ether, di (hexylbenzyl) ether, di (octylbenzyl) ether, diphenyl ether and structural isomers thereof, or the like; aromatic sulfides in which aromatic hydrocarbon compounds are bonded via a sulfide bond such as a diphenyl sulfide, (methylphenyl)-phenyl sulfide, (ethylphenyl)-phenyl sulfide, (butylphenyl)-phenyl sulfide, (hexylphenyl)-phenyl sulfide, (methylphenyl) sulfide, (ethylphenyl) sulfide, (butylphenyl) sulfide, (hexylphenyl) sulfide, di (methylbenzyl) sulfide, di (ethylbenzyl) sulfide, di (butylbenzyl) sulfide, di (pentylbenzyl) sulfide, di (hexylbenzyl) sulfide, di (octylbenzyl) sulfide, diphenyl sulfide, dibenzyl sulfide and structural isomers thereof, or the like; and the like.

(Compound E)

Compound E is a compound having an ether bond or a sulfide bond, an aliphatic hydrocarbon group, and an aromatic hydrocarbon group. Compound E is preferably a compound having 7 to 20 carbon atoms. Specific examples of compound E include a phenyl-methyl-ether, phenyl-ethyl-ether, phenyl-butyl-ether, phenyl-octyl-ether, phenyl-nonyl-ether, phenyl-decyl-ether, benzyl-ethyl-ether, benzyl-butyl-ether, benzyl-octyl-ether, benzyl-nonyl-ether, benzyl-decyl-ether, (methylphenyl) ethyl ether, (methylphenyl) butyl ether, (methylphenyl) octyl ether, (methylphenyl) nonyl ether, (methylphenyl) decyl ether, (ethylphenyl) ethyl ether, (ethylphenyl) butyl ether, (ethylphenyl) octyl ether, (ethylphenyl) nonyl ether, (ethylphenyl) decyl ether, (butylphenyl) ethyl ether, (butylphenyl) butyl ether, (butylphenyl) octyl ether, (butylphenyl) nonyl ether, (butylphenyl) decyl ether and structural isomers thereof, and the like.

(Compound F)

Compound F is a halide in which at least one hydrogen atom constituting an aliphatic hydrocarbon compound or at least one hydrogen atom constituting an aromatic hydrocarbon compound is substituted with a halogen atom. Compound F is preferably a compound having 2 to 20 carbon atoms. Specific examples of compound F include a chloroethane, chloropropane, chlorobutane, chloropentane, chlorohexane, chloroheptane, chlorooctane, chlorononane, chlorodecane, chlorododecane, chlorotetradecane, chloropentadecane, chlorohexadecane, chloroctadecane, chlorononadecane, chlorocyclopentane, chlorocyclohexane, chlorocycloheptane, chlorocyclooctane, chloromethylcyclopentane, chloroethylcyclopentane, chloromethylcyclohexane, chloroethyl cyclohexane, chloropropylcyclohexane, chlorobutyl cyclohexane, chloropentylcyclohexane, chlorohexyl cyclohexane, chlorodimethylcyclohexane, chlorodiethylcyclohexane, chlorodibutylcyclohexane, chlorobenzene, chloromethylbenzene, chloroethylbenzene, chlorobutylbenzene, chloropentylbenzene, chlorohexylbenzene, chloroctylbenzene, chlorobiphenyl, chloroterphenyl, chlorodiphenylethane, chloro (methylphenyl) phenylethane, chlorodimethylbiphenyl, chlorobenzyltoluene, chloronaphthalene, chloromethylnaphthalene, chloroethyl naphthalene, chlorobutylnaphthalene, dichloroethane, dichloropropane, dichlorobutane, dichloropentane, dichlorohexane, dichloroheptane, dichloroctane, dichlorononane, dichlorodecane, dichlorododecane, dichlorotetradecane, dichloropentadecane, dichlorohexadecane, dichlorocctadecane, dichlorononadecane, dichlorocyclopentane, dichlorocyclohexane, dichlorocycloheptane, dichlorocyclooctane, dichloromethylcycl opentane, dichloroethylcyclopentane, dichloromethylcyclohexane, dichloroethyl cyclohexane, dichloropropylcyclohexane, dichlorobutylcyclohexane, dichloropentylcyclohexane, dichlorohexylcyclohexane, dichlorodimethylcyclohexane, dichlorodiethylcyclohexane, dichlorodibutylcyclohexane, dichlorobenzene, dichloromethylbenzene, dichloroethylbenzene, dichlorobutylbenzene, dichloropentylbenzene, dichlorohexylbenzene, dichlorobutylbenzene, dichlorobiphenyl, dichloroterphenyl, dichlorodiphenylethane, dichloro (methylphenyl) phenylethane, dichlorodimethylbiphenyl, dichlorobenzyltoluene, dichloronaphthalene, dichloromethylnaphthalene, dichloroethyl naphthalene, dichlorobutylnaphthalene, dibromoethane, dibromopropane, dibromobutane, dibromopentane, dibromohexane, dibromoheptane, dibromomctane, dibromononane, dibromodecane, dibromododecane, dibromotetradecane, dibromopentadecane, dibromohexadecane, dibromocutadecane, dibromononadecane, dibromocyclopentane, dibromocyclohexane, dibromocycloheptane, dibromocyclooctane, dibromomethylcyclopentane, dibromoethylcyclopentane, dibromomethylcyclohexane, dibromoethyl cyclohexane, dibromopropylcyclohexane, dibromobutylcyclohexane, dibromopentylcyclohexane, dibromohexylcyclohexane, dibromo dimethylcyclohexane, dibromo diethyl cyclohexane, dibromodibutylcyclohexane, dibromobenzene, dibromomethylbenzene, dibromoethylbenzene, dibromobutylbenzene, dibromopentylbenzene, dibromohexylbenzene, dibromoctylbenzene, dibromobiphenyl, dibromoterphenyl, dibromodiphenylethane, dibromo (methylphenyl) phenylethane, dibromo dimethyl biphenyl, dibromobenzyltoluene, dibromonaphthalene, dibromomethylnaphthalene, dibromoethyl naphthalene, dibromobutylnaphthalene, difluoroethane, difluoropropane, difluorobutane, difluoropentane, difluorohexane, difluoroheptane, difluorooctane, difluorononane, difluorodecane, difluorododecane, difluorotetradecane, difluoropentadecane, difluorohexadecane, difluorocutadecane, difluorononadecane, difluorocyclopentane, difluorocyclohexane, difluorocycloheptane, difluorocyclooctane, difluoromethyl cyclopentane, difluoroethylcyclopentane, difluoromethylcyclohexane, difluoroethyl cyclohexane, difluoropropylcyclohexane, difluorobutylcyclohexane, difluoropentylcyclohexane, difluorohexyl cyclohexane, difluorodimethylcyclohexane, difluorodiethylcyclohexane, difluorodibutylcyclohexane, difluorobenzene, difluoromethylbenzene, difluoroethylbenzene, difluorobutylbenzene, difluoropentyl benzene, difluorohexylbenzene, difluorocutylbenzene, difluorobiphenyl, difluoroterphenyl, difluorodiphenylethane, difluoro (methylphenyl) phenylethane, difluorodimethylbiphenyl, difluorobenzyl toluene, difluoronaphthalene, difluoromethylnaphthalene, difluoroethylnaphthalene, difluorobutylnaphthalene and structural isomers thereof, and the like.

(Compound G)

Compound G is a compound in which some or all of the carbon atoms of compounds A to E are substituted with a silicon atom. Specific examples of compound G include a tetraethyl silane, tetrabutylsilane, tetrahexylsilane, tetracyclohexylsilane, tetraphenylsilane, dimethyl dibutyl silane, dimethyl dicyclohexyl silane, dimethyl diphenyl silane, hexamethylcyclotrisiloxane, hexaethylcyclotrisiloxane, hexacyclohexylcyclotrisiloxane, trimethyltricyclohexylcyclotrisiloxane, trimethyltriphenylcyclotrisiloxane, hexaphenylcyclotrisiloxane, octamethylcyclotetrasiloxane, octaethylcyclotetrasiloxane, octacyclohexyl cyclotetrasiloxane, tetramethyltetracyclohexylcyclotetrasiloxane, tetramethyltetraphenylcyclotetrasiloxane, octaphenylcyclotetrasiloxane, octamethyltrisiloxane, decamethyltetrasiloxane, tetramethyltetraphenyltrisiloxane, pentamethylpentaphenyltetrasiloxane and structural isomers thereof, and the like.

Among the examples, the compounds having an ether bond or a sulfide bond, such as compound C, compound D and compound E, may generate oxides or peroxides depending on the conditions. From the viewpoint of being thermally stable, compounds A, B, C, D, E and G are preferable, and compounds A, B and G are more preferable.

<Basic Amino Compound>

The amino compound is a derivative of ammonia, in which one hydrogen is substituted (primary) with an alkyl group or aryl group, or two hydrogens are substituted with an alkyl group or aryl group (secondary), or all three hydrogens are substituted with an alkyl group or aryl group (tertiary). Basic amino compounds preferably used in the present invention are secondary and tertiary amino compounds, and aliphatic amines, aromatic amines, heterocyclic amines and basic amino acids are preferably used.

Examples thereof include diethylamine, triethylamine, N,N'-diisopropylethylamine, tetramethylethylenediamine, aniline, ethyl phenyl amine, diethylphenylamine, 1,8-bis (dimethylamino) naphthalene, pyrrolidine, piperidine, piperazine, morpholine, 1,4-diazabicyclo [2,2,2] octane (DABCO), imidazole, pyridine, 4-dimethylaminopyridine, diazabicycloundecene (DBU), 7-methyl-1,5,7-triazabicyclo [4,4,0] decene (MTBD) and the like.

<Halogen Ion and/or Hydrolyzable Halogen Compound (Sometimes Referred to as Compound I)>

Examples of the halogen ion include a chlorine ion, a bromine ion and an iodine ion, and examples of the hydrolyzable halogen compound include a carbamoyl chloride compound added with a hydrochloric acid to the isocyanate group of the isocyanate compound, a carbamoyl bromide compound added with a hydrogen bromide to the isocyanate group, and preferable examples of the isocyanate compound is the isocyanate compound represented by the above formula (3). In addition, compound I is different from compound F described above.

<Sulfuric Acid and/or Sulfuric Acid Ester>

The sulfuric acid ester in this embodiment refers to a compound composed of an ester bond of an alcohol and an sulfuric acid, and specific examples thereof include a benzene sulfonic acid, vinyl sulfonic acid, methane sulfonic acid, p-toluene sulfonic acid, monomethyl sulfuric acid, monoethyl sulfuric acid, mono n-propyl sulfuric acid and the like. In addition, it may also be a sulfuric acid.

<Phosphoric Acid and/or Phosphoric Acid Ester>

The phosphoric acid ester in this embodiment refers to an ester in which a phosphoric acid and an alcohol are dehydrated and condensed, and it may be a phosphoric acid monoester, phosphoric acid diester, phosphoric acid trimester. Specifically, a methyl phosphoric acid, dimethyl phosphoric acid, butyl phosphoric acid, dibutyl phosphoric acid, isodecyl phosphoric acid, diisodecyl phosphoric acid, 2-ethyl hexyl phosphoric acid, di-2-ethyl hexyl phosphoric acid, lauryl phosphoric acid, dilauryl phosphoric acid, stearyl phosphoric acid, distearyl phosphoric acid, dioleyl phosphoric acid, phenyl phosphonic acid and the like may be mentioned. In addition, it may also be a phosphoric acid.

<Isocyanate Composition>

In the isocyanate composition of the present invention, the content of the isocyanate compound having an ethylenically unsaturated bond is preferably 97% by mass or more, and more preferably 98% by mass or more. The content of the isocyanate compound having an ethylenically unsaturated bond may be 99.5% by mass or less, or may also be 99% by mass or less.

First Embodiment

The first embodiment of the isocyanate composition of the present invention includes an isocyanate compound having an ethylenically unsaturated bond; and 1.0 to $1.0 \times 10^4$ ppm by mass of a compound represented by the following formula (1) which is different from the isocyanate compound with respect to a total mass of the isocyanate compound (hereinafter, may also be referred to as "compound X"), and/or 1.0 to $1.0 \times 10^4$ ppm by mass of a compound having a UV absorption in a spectral region of a decamer or higher isocyanate measured by gel permeation chromatography with respect to a total mass of the isocyanate compound (hereinafter, may also be referred to as "compound Y"), and/or 1.0 to $1.0 \times 10^4$ ppm by mass of a compound having an isocyanurate group or a biuret group with respect to a total mass of the isocyanate compound (hereinafter, may also be referred to as "compound Z").

Compound X, compound Y and compound Z described above may be used singly or in combination of plural kinds.

In general, in a compound containing an unsaturated bond as the compound represented by the above formula (1), the unsaturated bond tends to be easily oxidized, and an unsaturated bond compound as a contaminant tends to cause coloration. However, the unsaturated bond compound in the isocyanate composition of the first embodiment works effectively during the storage of the isocyanate composition to exert the effect of improving the stability of the isocyanate compound without coloring the isocyanate composition.

Although the mechanism by which such an effect is developed is not clear, it is presumed that the unsaturated bond between carbon and oxygen contained in the ester group of the compound has reactivity with water and oxygen, and the modification reaction of the isocyanate compound having an ethylenically unsaturated bond caused by water or oxygen can be suppressed. In addition, in the case of a compound having an unsaturated bond between carbon and oxygen, the tendency to exhibit its effect often increases.

In order to suppress the modification reaction of the isocyanate compound, it is preferable to increase the content of the compound represented by formula (1). However, if the content of the compound is too large, coloring due to the unsaturated bond as described above may occur, and the appearance at the time of use may be impaired in some cases. Therefore, the content of the unsaturated bond compound in the first embodiment is 1.0 to 1.0 $10^4$ ppm by mass with respect to the isocyanate compound, and the lower limit of the content range is preferably 3.0 or more ppm by mass, more preferably 5.0 or more ppm by mass, even more preferably 10 or more ppm by mass, and the upper limit of the content range is $5.0 \times 10^3$ or less ppm by mass, more preferably $3.0 \times 10^3$ or less ppm by mass, and even more preferably $1.0 \times 10^3$ or less ppm by mass.

Compound Y also has the same effect as the compound represented by formula (1). Although the mechanism by which the compound exerts the effect is not clear, the inventors of the present invention presume that it is because the compound has a 1-nylon skeleton having a high reactivity with water, oxygen, etc. as described above.

Compound Z also exerts the same effects as compound X and compound Y.

In the present invention, the isocyanate composition of the first embodiment preferably further includes, in addition to the above-mentioned compounds, 1.0 to $2.0 \times 10^4$ ppm by mass of at least one inert compound selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound with respect to a total mass of the isocyanate compound, the inert compound not having a carbon-carbon unsaturated bond and a carbon-oxygen double bond other than an unsaturated bond constituting an aromatic ring. These compounds may be included singly or plural kinds may be included.

In general, these inactive compounds do not have a reaction point with water, oxygen, etc., and it is unlikely that they have the same action as the above-mentioned compounds. However, as a result of investigation by the present inventors, surprisingly, it was found that the isocyanate composition of the first embodiment in which these compounds were further added also had the effect of improving the stability of the isocyanate.

Although the mechanism by which such an effect is developed is not clear, since the isocyanate compound is generally not attracted to water and oxygen, the isocyanate composition is stored in a storage container such as a sealed glass container, an 18-liter can, a drum can or the like. However, in the case of ordinary storage, it is presumed that leakage from the outside occurs and a very small amount of water, oxygen or the like is mixed at the time of filling the storage container with the isocyanate composition, causing an undesirable increase in the viscosity of the isocyanate composition and the generation of the gel component by the action of water or oxygen. On the contrary, it is presumed that in the isocyanate composition of the first embodiment, a part of these compounds coexisting in a trace amount is vaporized in the storage container and exists as a gas phase component in the gas phase portion of the storage container, thereby suppressing the influence of water and oxygen coexisting with a trace amount.

In consideration of the above circumstances, although it is preferable to include a large amount of these inactive compounds, if the amount is too large, there are cases in which the performance such as the viscosity or the like originally expected in the isocyanate composition is largely changed. Therefore, the content of the inert compound in the first embodiment is 1.0 to $1.0 \times 10^4$ ppm by mass, and the lower limit of the content range is 3.0 or more ppm by mass, more preferably 5.0 or more ppm by mass, even more preferably 10 or more ppm by mass, and the upper limit of the content range is preferably $5.0 \times 10^3$ or less ppm by mass, more preferably $3.0 \times 10^3$ or less ppm by mass, and even more preferably $1.0 \times 10^3$ or less ppm by mass.

The isocyanate composition of the first embodiment preferably further includes, in addition to the above-described compounds, a carbonic acid derivative in a range of 1.0 to $2.0 \times 10^4$ ppm by mass with respect to a total mass of the isocyanate compound, and the composition may be I) a composition including an isocyanate compound having an ethylenically unsaturated bond, wherein the composition is an isocyanate composition including 1.0 to $1.0 \times 10^4$ ppm by mass of compound X with respect to the total mass of the isocyanate compound in the composition, and/or 1.0 to $1.0 \times 10^4$ ppm by mass of compound Y with respect to the total mass of the isocyanate compound in the composition, and/or 1.0 to $1.0 \times 10^4$ ppm by mass of compound Z with respect to the total mass of the isocyanate compound in the composition; and the composition further includes 1.0 to $2.0 \times 10^4$ ppm by mass of a carbonic acid derivative, or II) a composition including an isocyanate compound having an ethylenically unsaturated bond, wherein the composition is an isocyanate composition including 1.0 to $1.0 \times 10^4$ ppm by mass of compound X with respect to the total mass of the isocyanate compound in the composition, and/or 1.0 to $1.0 \times 10^4$ ppm by mass of compound Y with respect to the total mass of the isocyanate compound in the composition, and/or 1.0 to $1.0 \times 10^4$ ppm by mass of compound Z with respect to the total mass of the isocyanate compound in the composition; and the composition further includes 1.0 to $2.0 \times 10^4$ ppm by mass of at least one inert compound selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound with respect to a total mass of the isocyanate compound, the inert compound not having a carbon-carbon unsaturated bond and a carbon-oxygen double bond other than an unsaturated bond constituting an aromatic ring; and 1.0 to $2.0 \times 10^4$ ppm by mass of a carbonic acid derivative.

Generally, unsaturated bonds tend to be easily oxidized in carbonic acid derivatives, and unsaturated bond compounds as contaminants tend to cause coloration. However, in the isocyanate composition of the first embodiment, the above compound effectively acts upon storage of the isocyanate composition and exerts the effect of improving the stability of the isocyanate compound without coloring the isocyanate composition.

Although the mechanism by which such an effect is exhibited is not clear, it is presumed that the ester moiety of the compound has reactivity with water or oxygen, and suppresses the modification reaction of isocyanate compounds having ethylenically unsaturated bonds due to water and oxygen.

In consideration of the above circumstances, although it is preferable to include a a large amount of the carbonic acid derivative, if the amount is too large, it will result in promoting coloring instead. Therefore, the content of the carbonic acid derivative in the first embodiment is 1.0 to $1.0 \times 10^4$ ppm by mass, and the lower limit of the content range is preferably 3.0 ppm by mass or more, more preferably 5.0 ppm by mass or more, even preferably 10 ppm by mass or more, and the upper limit of the content range is preferably $5.0 \times 10^3$ ppm by mass or less, more preferably $3.0 \times 10^3$ ppm by mass or less, and even more preferably $1.0 \times 10^3$ ppm by mass or less.

In addition, the isocyanate composition of the first embodiment may further include 1.0 to $1.0 \times 10^3$ ppm by mass of a sulfuric acid and/or a sulfuric acid ester, and/or 1.0 to $1.0 \times 10^3$ ppm by mass of a phosphoric acid and/or a phosphoric acid ester in addition to the above-described compounds, and the composition may be III) a composition including an isocyanate compound having an ethylenically unsaturated bond, wherein the composition includes 1.0 to $1.0 \times 10^4$ ppm by mass of compound X with respect to the total mass of the isocyanate compound in the composition, and/or 1.0 to $1.0 \times 10^4$ ppm by mass of compound Y with respect to the total mass of the isocyanate compound in the composition, and/or 1.0 to $1.0 \times 10^4$ ppm by mass of compound Z with respect to the total mass of the isocyanate compound in the composition; and the composition includes 1.0 to $1.0 \times 10^3$ ppm by mass of a sulfuric acid and/or a sulfuric acid ester, and/or 1.0 to $1.0 \times 10^3$ ppm by mass of a phosphoric acid and/or a phosphoric acid ester, or IV) a composition including an isocyanate compound having an ethylenically unsaturated bond, wherein the composition includes 1.0 to $1.0 \times 10^4$ ppm by mass of compound X with respect to the total mass of the isocyanate compound in the composition, and/or 1.0 to $1.0 \times 10^4$ ppm by mass of compound Y with respect to the total mass of the isocyanate compound in the composition, and/or 1.0 to $1.0 \times 10^4$ ppm by mass of compound Z with respect to the total mass of the isocyanate compound in the composition; and the composition includes 1.0 to $2.0 \times 10^4$ ppm by mass of a carbonic acid derivative and 1.0 to $1.0 \times 10^3$ ppm by mass of a sulfuric acid and/or a sulfuric acid ester, and/or 1.0 to $1.0 \times 10^3$ ppm by mass of a phosphoric acid and/or a phosphoric acid ester, or V) a composition including an isocyanate compound having an ethylenically unsaturated bond, wherein the composition includes 1.0 to $1.0 \times 10^4$ ppm by mass of compound X with respect to the total mass of the isocyanate compound in the composition, and/or 1.0 to $1.0 \times 10^4$ ppm by mass of compound Y with respect to the total mass of the isocyanate compound in the composition, and/or 1.0 to $1.0 \times 10^4$ ppm by mass of compound Z with respect to the total mass of the isocyanate compound in the composition; the composition includes 1.0 to $2.0 \times 10^4$ ppm by mass of at least one inert compound selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound with respect to a total mass of the isocyanate compound, the inert compound not having a carbon-carbon unsaturated bond and a carbon-oxygen double bond other than an unsaturated bond constituting an aromatic ring; 1.0 to $2.0 \times 10^4$ ppm by mass of a carbonic acid derivative; and 1.0 to $1.0 \times 10^3$ ppm by mass of a sulfuric acid and/or a sulfuric acid ester, and/or 1.0 to $1.0 \times 10^3$ ppm by mass of a phosphoric acid and/or a phosphoric acid ester.

A preferred concentration range of the sulfuric acid and/or the sulfuric acid ester is 1.0 to $1.0 \times 10^2$ ppm by mass with respect to the isocyanate compound having an ethylenically unsaturated bond, and the lower limit of the content range is preferably 3.0 ppm by mass or more, more preferably 5.0 ppm by mass or more, and it is even more preferable that the upper limit of the content range be $5.0\times10^1$ ppm by mass.

A preferable concentration range of the phosphoric acid and/or phosphoric acid ester is 1.0 to $1.0\times10^2$ ppm by mass with respect to the isocyanate compound having an ethylenically unsaturated bond, and the lower limit of the content range is preferably 3.0 ppm by mass or more, more preferably 5.0 ppm by mass or more, and even more preferable that the upper limit of the content range be $5.0\times10^1$ ppm by mass.

It is preferable that in addition to the above-described compounds, the isocyanate composition of the first embodiment further include a basic amino compound and/or a halogen ion and/or a hydrolyzable halogen compound in an amount of 1.0 to $1.0\times10^4$ ppm by mass with respect to the isocyanate compound.

These compositions which further include a basic amino compound and/or a halogen ion and/or a hydrolyzable halogen compound also have the effect of improving the stability during storage. Although the mechanism that exerts such an effect is not clear, it is presumed that the halogen atom traps oxygen or water that impairs the stability of the isocyanate compound, thereby improving the stability of the isocyanate compound.

In consideration of the above circumstances, although it is preferable that a large amount of basic amino compound and/or the halogen ion and/or the hydrolyzable halogen compound be included, if the amount is too large, it will result in promoting coloring instead. Therefore, the content of the basic amino compound and/or the halogen ion and/or the hydrolyzable halogen compound in the first embodiment is 1.0 to $1.0\times10^4$ ppm by mass, and the lower limit of the content range is preferably 3.0 ppm by mass or more, more preferably 5.0 ppm by mass or more, even more preferably 10 ppm by mass or more, and the upper limit of the content range is preferably $5\times10^3$ ppm by mass or less, more preferably $3.0\times10^3$ ppm by mass or less, and even more preferably $1.0\times10^3$ ppm by mass or less.

Second Embodiment

The second embodiment of the isocyanate composition of the present invention includes an isocyanate compound having an ethylenically unsaturated bond; and 1.0 to $1.0\times10^4$ ppm by mass of a compound different from the isocyanate compound having an ethylenically unsaturated bond and having at least one unsaturated bond other than an unsaturated bond constituting an aromatic ring with respect to a total mass of the isocyanate compound having an ethylenically unsaturated bond, or 1.0 to $2.0\times10^4$ ppm by mass of an inert compound not having a carbon-carbon unsaturated bond other than an unsaturated bond constituting an aromatic ring, which is at least one selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound with respect to a total mass of the isocyanate compound having an ethylenically unsaturated bond; 1.0 to $1.0\times10^3$ ppm by mass of a sulfuric acid and/or a sulfuric ester, and/or 1.0 to $1.0\times10^3$ ppm by mass of a phosphoric acid, and/or a phosphoric ester with respect to a total mass of the isocyanate compound having an ethylenically unsaturated bond.

There are plural kinds of preferred embodiments as the isocyanate composition of the second embodiment. Hereinafter, the preferred embodiment will be described with two examples, but the present invention is not limited thereto.

VI) An isocyanate composition containing an isocyanate compound having an ethylenically unsaturated bond; and a compound (unsaturated bond compound) different from the isocyanate compound having an ethylenic unsaturated bond and having at least one unsaturated bond other than an unsaturated bond constituting an aromatic ring.

According to the isocyanate composition of the present embodiment shown in the above VI), it is possible to provide an isocyanate composition with improved stability during storage.

The content of the unsaturated bond compound is 1.0 to $1.0\times10^4$ ppm by mass (0.0001 to 1% by mass or less) with respect to the isocyanate compound having an ethylenically unsaturated bond. The unsaturated bond compound may be used alone, or used in combination of two or more.

In general, unsaturated bonds tend to be oxidized easily, but the unsaturated bond compound used in the present embodiment effectively acts upon storage of the isocyanate composition and exerts the effect of improving the stability of the isocyanate without coloring the isocyanate composition.

Although the mechanism by which such an effect is exhibited is not clear, it is presumed that by the selective action of the unsaturated bond in the unsaturated bond compound with water, oxygen or the like, it is possible to suppress the modification reaction of the isocyanate compound having an ethylenically unsaturated bond caused by water or oxygen In order to suppress the modification reaction of the isocyanate, although it is preferable to increase the content of the unsaturated bond compound, if the content of the unsaturated bond compound is too large, coloring due to the unsaturated bond as described above may occur, and the appearance at the time of use may be impaired in some cases. Therefore, the content of the unsaturated bond compound in this embodiment is 1.0 to $1.0\times10^4$ ppm by mass, and the lower limit of the content range is preferably 3.0 ppm by mass or more, more preferably 5.0 ppm by mass or more, even more preferably 10 ppm by mass or more, and the upper limit of the content range is preferably $5.0\times10^3$ ppm by mass or less, more preferably $3.0\times10^3$ ppm by mass or less, and even more preferably $1.0\times10^3$ ppm by mass or less.

The above-mentioned isocyanate composition including an unsaturated bond compound may further include at least one inert compound selected from the group consisting of a hydrocarbon compound, an ether compound, a sulfide compound, a halogenated hydrocarbon compound, a silicon-containing hydrocarbon compound, a silicon-containing ether compound, and a silicon-containing sulfide compound. These inert compounds may be used alone or in combination of two or more. These inert compounds can be expected to exhibit the same effect as the effect described in the following VI), and contribute to the improvement of the stability of the isocyanate composition in combination with the effect of the unsaturated bond compound.

VII) An isocyanate composition including an isocyanate compound having an ethylenically unsaturated bond, and at least one inert compound selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound According to the present embodiment shown in the above VII), it is possible to provide an isocyanate composition with improved stability during storage.

The content of the inert compound is 1.0 to $2.0 \times 10^4$ ppm by mass (0.0001 to 2% by mass) with respect to the compound having an ethylenically unsaturated bond. The inert compound may be used alone, or in combination of two or more.

In general, the above-mentioned inert compound does not have a reaction point with water, oxygen or the like, and it is unlikely that the inert compound has the same action as the above-mentioned unsaturated bond compound. However, as a result of investigation by the inventors of the present invention, surprisingly, the isocyanate composition of this embodiment including the inert compound also has the effect of improving the stability of isocyanate.

Although the mechanism by which such an effect is developed is not clear, since the isocyanate is generally not attracted to water and oxygen, the isocyanate composition is stored in a storage container such as a sealed 18-liter can, drum can or the like. However, in the case of ordinary storage, it is presumed that leakage from the outside occurs and a very small amount of water, oxygen or the like is mixed at the time of filling the storage container with the isocyanate composition, causing the undesirable increase in the viscosity of the isocyanate composition and the generation of the gel component by the action of water or oxygen. On the contrary, it is presumed that in the composition of the present embodiment, a part of the inert compounds coexisting in a trace amount is vaporized in the storage container and exists as a gas phase component in the gas phase portion of the storage container, thereby suppressing the influence of water and oxygen coexisting with a trace amount.

In consideration of the above circumstances, although it is preferable to include a large amount of these inactive compounds, if the amount of the inert compound is too large, there are cases in which the performance such as a viscosity or the like originally expected in the isocyanate composition is largely changed. Therefore, the content of the inert compound in the present embodiment is 1.0 to $1.0 \times 10^4$ ppm by mass, and the lower limit of the content range is 3.0 or more ppm by mass, more preferably 5.0 or more ppm by mass, even more preferably 10 or more ppm by mass, and the upper limit of the content range is preferably $5.0 \times 10^3$ or less ppm by mass, more preferably $3.0 \times 10^3$ or less ppm by mass, and even more preferably $1.0 \times 10$ or less ppm by mass.

VIII) An isocyanate composition including an isocyanate compound having an ethylenically unsaturated bond; and a sulfuric acid and/or a sulfuric acid ester and/or a phosphoric acid and/or a phosphoric acid ester According to the embodiment shown in the above VIII), an isocyanate composition with improved stability during storage can be provided.

The content of the sulfuric acid and/or the sulfuric acid ester and/or the phosphoric acid and/or the phosphoric acid ester is 1.0 to $1.0 \times 10^2$ ppm by mass with respect to the compound having an ethylenically unsaturated bond. The compounds may be used alone, or in combination of two or more.

Although the mechanism by which a sulfuric acid, sulfuric acid ester, phosphoric acid, or phosphoric acid ester has an effect of improving the stability of the isocyanate composition during storage is not clear, it is presumed that in the composition of the present embodiment, these compounds moderately inhibit the formation of the 1-nylon structure represented by the above formula (15) and inhibit gelation of the whole composition due to the increase of the compound.

Therefore, in order to further improve the stability of the isocyanate, it is preferable that these compounds be included in an appropriate concentration range, and in the case of the sulfuric acid and/or the sulfuric acid ester, with respect to the isocyanate compound, the content range is 1.0 to $1.0 \times 10^2$ ppm by mass, and the lower limit of the content range is preferably 3.0 ppm by mass or more, more preferably 5.0 ppm by mass or more, and it is more preferable that the upper limit of the content range be $5.0 \times 10^1$ ppm by mass or less, and in the case of the phosphoric acid and/or the phosphoric acid ester, the content range is 1.0 to $1.0 \times 10^2$ ppm by mass, and the lower limit of the content range is preferably 3.0 ppm by mass or more, more preferably 5.0 ppm by mass or more, and it is more preferable that the upper limit of the content range be $5.0 \times 10^1$ ppm by mass or less.

In addition, the isocyanate composition including the inactive compound of the present embodiment may include various unsaturated bond compounds described above. These unsaturated bond compounds may be used alone or in combination of two or more. These unsaturated bond compounds can be expected to exhibit the same effect as described in the composition of the above V), and contribute to the improvement of the stability of the isocyanate composition in combination with the effect of the inert compound.

<Method for Producing Isocyanate Composition>

The isocyanate composition of the present embodiment can be produced by appropriately combining an isocyanate compound having an ethylenically unsaturated bond with a compound represented by the above formula (1), a compound having a UV absorption in a spectral region of a decamer or higher isocyanate measured by gel permeation chromatography, a compound having an isocyanurate group and/or a biuret group, further with an inert compound (a hydrocarbon compound, an ether compound, a sulfide compound, a halogenated hydrocarbon compound, a silicon-containing hydrocarbon compound, a silicon-containing ether compound and a silicon-containing sulfide compound which is an inert compound not having a carbon-carbon unsaturated bond and carbon-oxygen double bond other than an unsaturated bond constituting an aromatic ring), a basic amino compound, a halogen ion, or a hydrolyzable halogen compound.

The isocyanate compound having an ethylenically unsaturated bond can be produced by a known method. For example, the reaction between a corresponding amine and a phosgene and the like can be mentioned.

The isocyanate composition of the present embodiment can be produced in such a manner that the isocyanate compound having an ethylenically unsaturated bond produced by the above-mentioned known method is subjected to a purification step by a known method and used as an isocyanate compound having an ethylenically unsaturated bond, followed by appropriately mixing with a compound represented by the above formula (1), a compound having a UV absorption in a spectral region of a decamer or higher isocyanate measured by gel permeation chromatography, a compound having an isocyanurate group and/or a biuret group, a compound having an unsaturated bond, an inert compound, a sulfuric acid, a sulfuric acid ester, a phosphoric acid, a phosphoric acid ester, a basic amino compound, or a hydrolyzable halogen compound. In the production process of the isocyanate compound described above, these compounds constituting the isocyanate composition of the present embodiment may be added beforehand so as to be included in the isocyanate composition of the present embodiment or added after the isocyanate compound is obtained so as to be further included in the isocyanate composition of the present embodiment.

In the spectrum measured by gel permeation chromatography, a compound having a UV absorption in a spectral region of a decamer or higher isocyanate measured by gel permeation chromatography can be produced by, for example, reacting an isocyanate compound having one or more isocyanate groups in the molecule in the presence of a catalyst, and then adding a terminating agent to terminate the polymerization reaction. As the catalyst, the same catalyst as used in the isocyanurate-forming reaction to be described later can be used. The amount of the catalyst to be used varies depending on the type of the compound to be used, but it can be $1.0\times10^{-4}$ to 1.0 part by mass with respect to 100 parts by mass of the isocyanate compound. From the viewpoint of suppressing coloring or discoloration of the product and controlling the reaction, the upper limit of the amount of the catalyst to be used is preferably $5.0\times10^{-1}$ parts by mass or less, more preferably $1.0\times10^{-1}$ parts by mass or less, and more preferably $2.0\times10^{-2}$ parts by mass or less. From the viewpoint of reactivity, the lower limit of the amount of the catalyst to be used is more preferably $1.0\times10^{-3}$ parts by mass or more, even more preferably $2.0\times10^{-3}$ parts by mass or more.

As the terminating agent, the same terminating agent as used in the isocyanurate-forming reaction to be described later can be used. The amount of the terminating agent to be used can be appropriately adjusted depending on the amount of the catalyst to be used and the type of compound to be used, but it is preferably used in an amount of 1 equivalent or more with respect to the amount of the catalyst to be used.

The temperature at which the polymerization reaction of the isocyanate compound is carried out in the presence of the catalyst is preferably −20° C. to 60° C. When the reaction temperature increases, the isocyanurate-forming reaction tends to proceed more easily. In order to obtain a 1-nylon structure, the reaction temperature is preferably as low as possible, but on the other hand, because the polymerization reaction of the isocyanate compound is too slow at too low a reaction temperature, the temperature is more preferably −10° C. to 50° C., and even more preferably 0° C. to 40° C.

The polymerization of the isocyanate compound can be carried out in the presence or absence of a solvent, but from the viewpoints of easy control of the reaction and ease of operation, it is desirable to carry out the polymerization in the presence of a solvent. As the solvent, a solvent which is inert to the isocyanate compound to be used and which dissolves the raw material isocyanate compound and the resulting polymer can be selected. Specifically, as a solvent, acetate esters such as ethyl acetate, butyl acetate, amyl acetate and the like; aromatic hydrocarbons such as benzene, toluene, xylene, monochlorobenzene and the like can be used alone or in combination.

Progress of the polymerization can be traced by suitably sampling the reaction solution and conducting gel permeation chromatography measurement. When a peak is confirmed in a desired molecular weight region, the reaction may be stopped by adding a terminating agent. In the case of conducting the isocyanurate-forming reaction in the absence of a solvent, by controlling the conversion rate to 50% or less, the unreacted isocyanate compound acts as a solvent and can dissolve the produced polymer.

The compound having a UV absorption in the region of a decamer or higher isocyanate measured by gel permeation chromatography, which is produced by such a method, for example, may be recovered by removing unreacted isocyanate compound and the solvent from the reaction system after completion of the above reaction, or may be directly used as a reaction solution in the production of the isocyanate composition of the present embodiment. In the case of recovering the isocyanurate compound, the method is not particularly limited, and it is possible to remove unreacted polyisocyanate and the solvent by, for example, distillation purification. The removal is preferably performed at a low temperature. For example, it is preferable to perform the removal using a device having a large evaporation area and a high evaporation efficiency, such as a falling-film type evaporator, a thin film evaporator, a molecular distillation apparatus or the like.

With respect to the compound containing an isocyanurate group or a biuret group, the compound containing an isocyanurate group can be produced by a method similar to the <Method for producing isocyanate polymer> to be described later. The compound containing a biuret group can be produced in such a manner that water, a monovalent tertiary alcohol, formic acid, hydrogen sulfide, an organic primary monoamine, an organic primary diamine or the like is used as the biuretizing agent, the reaction temperature is set in a range of 70° C. to 200° C., the reaction is allowed to proceed for 10 minutes to 24 hours, and after completion of the reaction, unreacted polyisocyanate and solvent are separated from the composition containing the isocyanate polymer by a treatment such as a thin film distillation method, a solvent extraction method or the like. In the biuretizing reaction, the same solvent as used in the <Method for producing isocyanate polymer> to be described later> may be used.

<Method for Producing Isocyanate Polymer>

In the present embodiment, the present invention provides a method for producing an isocyanate composition including a step of mixing the isocyanate composition described above and an isocyanate having two or more functional groups, and a step of reacting the isocyanate compound contained in the isocyanate composition described above with the isocyanate having two or more functional groups. Hereinafter, the production method of this embodiment will be described. Incidentally, although the isocyanurate-forming reaction will be mainly described, known reactions such as an iminooxadiazine dione-forming reaction and a uretdione-forming reaction can also be used depending on the catalyst or reaction conditions to be described later.

The mixing ratio between the isocyanate composition described above and the isocyanate having two or more functional groups can be arbitrarily adjusted. The isocyanate having two or more functional groups is not particularly limited and can be appropriately changed according to the desired isocyanurate. For example, an isocyanate which is an aliphatic and/or an alicyclic is preferable from the viewpoint of obtaining an isocyanurate polymer that can be suitably used for applications requiring weather resistance. Also, an aromatic isocyanate can be selected for the purpose of application to fields where weather resistance or the like is not required.

The isocyanurate-forming reaction is preferably carried out in the presence of an isocyanurate-forming catalyst. As the specific isocyanurate-forming catalyst, for example, those having basicity are generally preferable, and the following compounds (i) to (viii) and the like may be exemplified.

(i) A hydroxide or an organic acid salt (for example, a salt such as acetate, butyrate, decanoate or the like) of tetraalkylannmmonium (tetramethylammonium, tetraethylammonium or the like).

(ii) A hydroxide or an organic acid salt (for example, a salt such as acetate, butyrate, decanoate or the like) of trialkylhydroxyalkylammonium (trimethylhydroxypropylanlnonium, trimethylhydroxyethylammonium, triethylhydroxypropylammonium, triethylhydroxyethylammonium, or the like).

(iii) A metal salt (for example, tin salt, zinc salt, lead salt, sodium salt, potassium salt or the like) of an alkylcarboxylic acid such as acetic acid, capric acid, octylic acid, myristic acid or the like.

(iv) An alkoxide of a metal such as sodium, potassium or the like.

(v) An aminosilyl group-containing compound (for example, hexamethyldisilazane or the like).

(vi) A phosphorus compound such as tributylphosphine or the like.

(vii) A fluorine compound or a polyfluorohydrogen compound (for example, a tetraalkylammonium fluoride such as tetramethylaniunonium fluoride hydrate, tetraethylammonium fluoride or the like).

(viii) A compound containing a structure represented by the following formula (12) or formula (13) (for example, 3,3,3-trifluoropropanoic acid, 3,3,4,4,4-pentafluorobutanoic acid, 3, 3, 4, 4, 5, 5, 5-heptafluoropentanoic acid, 3, 3-difluoroprop-2-enoic acid or the like), and a quaternary ammonium ion or a quaternary phosphonium ion.

[Chemical formula 22]

$$R^{22}=CR'-C(=O)O- \qquad (12)$$

[Chemical formula 23]

$$R^{23}-CR'_2-C(=O)O- \qquad (13)$$

[In the formulas (12) and (13), each of $R^{22}$ and $R^{23}$ independently represents a perfluoroalkyl group having 1 to 30 carbon atoms, and each of R' independently represents a hydrogen atom or a group consisting of an alkyl group having 1 to 20 carbon atoms and an aromatic group. $R^{22}$, $R^{23}$ and R' may contain a hetero atom.]

In the formulas (12) and (13), each of $R^{22}$ and $R^{23}$ may independently be a linear, branched or cyclic saturated perfluoroalkyl group, or unsaturated perfluoroalkyl group.

Among the above-mentioned isocyanurate-forming catalysts, the above-mentioned catalyst (i) or (ii) is preferable from the viewpoint of catalyst efficiency and isocyanurate-forming reaction selectivity. In addition, when it is desired to form a large proportion of the uretdione structure, the above-described catalyst (vi) is preferably used. In addition, when it is desired to form a large proportion of the iminooxadiazinedione structure, the above-described catalyst (vii) or catalyst (viii) is preferably used.

The amount of the isocyanurate-forming catalyst to be added to the reaction system of the isocyanurate-forming reaction can be appropriately adjusted depending on the type of the catalyst to be used, the concentration of other components in the reaction system or the like. For example, the content may be 1.0 to $10^{-4}$ to 1.0 parts by mass with respect to 100 parts by mass of the isocyanate compound. The upper limit of the amount of the isocyanurate-forming catalyst to be used is preferably $5.0\times10^{-1}$ parts by mass or less, more preferably $1.0\times10^{-1}$ parts by mass or less, and more preferably $2.0\times10^{0.2}$ parts by mass or less from the viewpoint of suppressing coloring or discoloration of the product and controlling the reaction. From the viewpoint of reactivity, the lower limit of the amount of the isocyanurate-forming catalyst to be used is more preferably $1.0\times10^{-3}$ parts by mass or more, even more preferably $2.0\times10^{-3}$ parts by mass or more.

The above-described isocyanurate-forming catalyst can also be an allophanate-forming catalyst. Therefore, it is also possible to add a hydroxyl group-containing compound before or during the isocyanurate-forming reaction, and allow the isocyanurate-forming reaction and the allophanate-forming reaction to proceed at the same time.

In this case, the hydroxyl group-containing compound is preferably a compound having one or two hydroxy groups in one molecule formed only by carbon, hydrogen and oxygen. More preferably, it is a compound having only one hydroxy group. Specific examples of the compound having one hydroxy group include methyl alcohol, ethyl alcohol, propyl alcohol, butyl alcohol, pentyl alcohol, hexyl alcohol, heptyl alcohol, octyl alcohol, nonyl alcohol and the like, and examples of the compound having two hydroxyl groups include ethylene glycol, 1,3-butanediol, 1,4-butanediol, neopentyl glycol, 2-ethylhexanediol and the like, and two or more kinds thereof can be used in combination.

The reaction temperature of the isocyanurate-forming reaction is not particularly limited, but it is preferably 0° C. to 200° C. If it is less than 0° C., the reaction rate is low and it is not practical. When it is reacted at a high temperature exceeding 200° C., side reactions and extreme coloration of the products tend to occur easily. Among them, from the viewpoint of the reaction rate, the lower limit of the reaction temperature is more preferably 40° C., even more preferably 50° C., and particularly preferably 60° C. From the viewpoint of coloration of the product itself, or the like, the upper limit of the reaction temperature is more preferably 150° C., even more preferably 120° C., and particularly preferably 110° C.

The reaction time of the isocyanurate-forming reaction is not particularly limited, and it can be carried out, for example, in the range of 10 seconds to 24 hours.

As a method of confirming the end point of the isocyanurate-forming reaction, a method of measuring the content (NCO %) of the isocyanate group in the reaction mixture, a method of measuring the refractive index, a method of measuring the reaction mixture by gel permeation chromatography, and the like can be exemplified. The method of measuring the content (NCO %) of the isocyanate group in the reaction mixture will be described later.

If the isocyanurate-forming reaction proceeds excessively, the viscosity of the product increases and the content ratio of the isocyanurate compound increases, thereby in some cases, products with desired physical properties may not be obtained. For this reason, the conversion of the reaction (the mass ratio of the isocyanate polymer obtained by the reaction to the initial mass of the raw material isocyanate compound) is preferably not more than 50% (more preferably not more than 40%, even more preferably not more than 25%). From the viewpoint of obtaining the isocyanurate compound at a sufficient yield, the conversion of the reaction is preferably 5% or more, more preferably 10% or more, and even more preferably 15% or more.

In the production method of this embodiment, the isocyanurate-formning reaction can be stopped by deactivating the isocyanurate-forming catalyst by adding a catalyst-terminating agent at the stage when the isocyanurate-forming reaction reaches the target conversion rate. Without the addition of the catalyst-terminating agent, the isocyanurate-forming reaction may further proceed in the step of distilling off the residual monomer and the solvent from the isocyanate polymer or at the time of storage, which may cause the product to have a high viscosity or a gel content. Therefore, it is preferable to deactivate the isocyanurate-forming catalyst by adding a catalyst-terminating agent at the time when the target conversion rate is reached.

As the catalyst-terminating agent, for example, a sulfuric acid, a phosphoric acid, an acidic phosphoric ester, a hydrochloric acid, a sulfonic acid compound and the like can be used. When the reaction product of the catalyst-terminating agent and the catalyst precipitates as a solid, it is preferable to separate by a method such as filtration using a filter or celite.

The isocyanurate-forming reaction can be carried out in the presence or absence of a solvent, but from the viewpoints of easy control of the reaction and ease of operation, it is preferable to carry out the reaction in the presence of a solvent.

As a solvent to be used for the isocyanurate-forming reaction, a solvent which is inert to the isocyanate compound to be used and which dissolves the raw material isocyanate compound and the produced isocyanurate compound may be selected. Specifically, as a solvent, acetate esters such as ethyl acetate, butyl acetate, amyl acetate and the like; aromatic hydrocarbons such as benzene, toluene, xylene, monochlorobenzene and the like can be used alone or in combination.

In the case of carrying out the isocyanurate-forming reaction in the absence of a solvent, by controlling the conversion rate to 50% or less, the unreacted isocyanate compound can act as a solvent and can dissolve the produced isocyanurate compound. From such a viewpoint, the conversion rate of the isocyanurate-forming reaction in the absence of a solvent is preferably 5% to 50%, more preferably 10% to 40%.

After completion of the reaction of the isocyanurate-forming reaction, for example, the isocyanurate compound can be recovered by removing unreacted isocyanate compound and solvent from the reaction system. The removal method is not particularly limited, and it is possible to remove unreacted isocyanate compound and solvent by, for example, distillation purification. The removal is preferably performed at a low temperature. For example, it is preferable to perform the removal using a device having a high evaporation efficiency and a large evaporation area, such as a falling-thin film type evaporator, a thin film evaporator, a molecular distillation apparatus or the like.

<Isocyanate Polymer>

The isocyanate polymer obtained by the production method described above contains a unit represented by the following formula (11), and the nitrogen atom constituting the isocyanate polymer is bonded to a carbon atom. That is, the above-described production method is a method including a step of mixing an isocyanate composition containing the aforementioned isocyanate compound having an ethylenically unsaturated bond and an isocyanate having two or more functional groups, and a step of reacting the isocyanate compound contained in the isocyanate composition with the isocyanate having two or more functional groups, wherein a unit represented by the following formula (11) is included and the nitrogen atom constituting the isocyanate polymer is bonded to a carbon atom.

[Chemical formula 24]

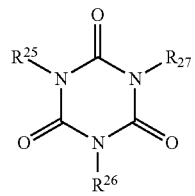

(11)

[In formula (11), each of $R^{25}$, $R^{26}$, and $R^{27}$ independently represents a residue obtained by removing an isocyanate group from the isocyanate compound contained in the isocyanate composition, or a residue obtained by removing an isocyanate group from the isocyanate having two or more functional groups, and at least one of $R^{25}$, $R^{26}$ and $R^{27}$ represents a residue obtained by removing an isocyanate group from the isocyanate compound.]

Accordingly, the present invention provides, in the embodiment, an isocyanate polymer including a unit represented by the following formula (11), wherein a nitrogen atom constituting the isocyanate polymer is bonded to a carbon atom.

[Chemical formula 25]

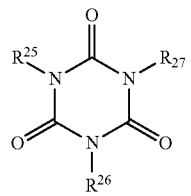

(11)

[In formula (11), each of $R^{25}$, $R^{26}$ and $R^{27}$ independently represents a residue obtained by removing an isocyanate group from an isocyanate compound having an ethylenically unsaturated bond, or a residue obtained by removing an isocyanate group from an isocyanate having two or more functional groups, and at least one of $R^{25}$, $R^{26}$ and $R^{27}$ represents a residue obtained by removing an isocyanate group from the isocyanate compound.]

In the above formula (11), it is preferable that each of $R^{25}$, $R^{26}$, and $R^{27}$ be an organic group, and at least one of $R^{25}$, $R^{26}$ and $R^{27}$ be an organic group containing an ethylenic double bond.

<Utilization of Isocyanate Polymer>

Using a composition containing various isocyanate polymers obtained by the production method described above, a blocked isocyanate polymer can be produced by blocking a part or all of the isocyanate groups of the isocyanate polymer with a blocking agent by a known method.

In addition, for the purpose of improving the water dispersibility, it is also possible to obtain a composition of a hydrophilic group-modified isocyanate polymer obtained by modifying a part of the isocyanate groups of the various isocyanate polymers obtained by the above method with an active hydrogen-containing hydrophilic compound by a known method.

In addition, when using it as an aqueous one-component coating material or a crosslinking agent for a coating agent, it is also possible to react the isocyanate polymer obtained by the above-described production method respectively with the blocking agent and the active hydrogen-containing hydrophilic compound.

In addition, the above-described isocyanate polymer can also be used as a raw material of a UV-curable coating material.

As described above, the isocyanate composition of the present embodiment exerts the effect of improving the stability during storage. The isocyanate composition of the present embodiment is suitably used as a raw material for paints, adhesives and the like.

<Method of Storing Isocyanate Composition>

In the embodiment, the present invention also provides a method of storing an isocyanate compound having an ethylenically unsaturated bond. In the storing method of the present embodiment, the first aspect includes preparing an isocyanate composition including an isocyanate compound having an ethylenically unsaturated bond, and 1.0 to $1.0 \times 10^4$ ppm by mass of compound X with respect to the isocyanate compound, and/or 1.0 to $1.0 \times 10^4$ ppm by mass of compound Y with respect to the isocyanate compound, and/or compound Z; and the second aspect includes preparing an isocyanate composition including 1.0 to $1.0 \times 10^4$ ppm by mass of a compound different from the isocyanate compound and having at least one unsaturated bond other than an unsaturated bond constituting an aromatic ring, or 1.0 to $2.0 \times 10^4$ ppm by mass of an inert compound not having a carbon-carbon unsaturated bond other than an unsaturated bond constituting an aromatic ring, which is at least one selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound with respect to the isocyanate compound.

Even when the isocyanate compound having an ethylenically unsaturated bond is stored for a long period of, for example, 100 days or more, for example, 200 days or more, for example, 300 days or more, for example, 500 days or more by the storage method of this embodiment, it is possible to prevent increase in viscosity and increase in chromaticity of the isocyanate compound.

EXAMPLE

Hereinafter, the present invention will be described more specifically with reference to Examples, but the present invention is not limited to Examples.

<Number-Average Molecular Weight>

The number-average molecular weight of the sample was measured by gel permeation chromatography (GPC). The measurement method of GPC was as follows.

Equipment: HLC-8120 (manufactured by Tosoh Corporation),

Column: TSK GEL Super H1000, TSK GEL Super H2000, TSK GEL Super H3000 (all manufactured by Tosoh Corporation), Sample concentration: 5 wt/vol % (50 mg of the sample was dissolved in 1 mL of tetrahydrofuran (THF))

Carrier: THF

Detection method: Parallax refractometer

Outflow amount: 0.6 mL/min,

Column temperature: 30° C.

A polystyrene having a molecular weight of 1,000 to 20,000 was used for preparing a calibration curve.

<Gas Chromatography (GC)>

Column: inner diameter 0.32 mm, length 30 m, liquid phase film thickness 1.0 μm (manufactured by J & W Scientific, DB-1)

Column temperature: initial temperature 50° C., then raise at 10° C./min, final temperature 300° C. (15 min hold)

Inlet temperature: 300° C.

Detector temperature: 300° C.

Detector: Hydrogen flame ionization detector

Carrier gas: Helium

Carrier gas flow rate (column): 1.2 mL/min

<Liquid Chromatography (LC)>

Liquid chromatograph: LC-10AT system (manufactured by Shimadzu Corporation)

Column: two lnertsil-ODS columns (manufactured by GL Science) are connected in series Development solvent: a mixed solution of 5 mmol/L ammonium acetate aqueous solution (liquid A) and acetonitrile (liquid B)

Development solvent flow rate: 2 mL/min

Column temperature: 35° C.

Detector: differential refractive index detector and photodiode array detector (measurement wavelength range: 200 nm to 300 nm)

<Hazen Color Number (APHA)>

Numerical values obtained by measurement with a Hazen meter were used.

<Measurement of Chlorine Concentration and Bromine Concentration>

A weighed sample was placed on a sample board of a pre-combustion treatment apparatus, the sample board was moved to a combustion section, and the sample was burned in an automatic combustion apparatus to absorb the gasified components into the absorption liquid. The absorption solution was injected into an ion chromatograph to quantify the target component.

Pre-combustion treatment apparatus: automatic combustion apparatus

AQF-100 (manufactured by Mitsubishi Analytics)

Furnace temperature: inlet 900° C., outlet 1000° C.

Gas flow rate: 400 mL/min of $Ar/O_2$, 200 mL/min of $O_2$

Ion chromatograph: ICS-1500 (manufactured by DIONEX Corporation)

Guard column: AG 12 A

Separation column: AS 12 A

Suppressor: ASRS-300 suppressor current 50 mA

Eluent: 2.7 mM $Na_2CO_3$, 0.3 mM $NaHCO_3$

Synthesis Example A-1

2-(2-methylacryloyloxy)-ethylammonium chloride was synthesized by reacting ethanolamine hydrochloride with methacrylic anhydride. Next, 2-methyl-acrylic acid-2-[(imidazole-1-carbonyl)-amino] ethyl ester was synthesized by reacting carbonyldiimidazole with 2-(2-methylacryloyloxy)-ethylammonium chloride. Subsequently, the obtained 2-methyl-acrylic acid-2-[(imidazole-1-carbonyl)-amino] ethyl ester was reacted with hydrogen chloride to obtain a crude methacryloyloxyethyl isocyanate (hereinafter sometimes referred to as MOI).

Synthesis Example A-2

2-aminoethyl methacrylate hydrochloride was produced from methacrylic acid and ethanolamine, and then the obtained 2-aminoethyl methacrylate hydrochloride was reacted with phosgene to synthesize methacryloyloxyethyl isocyanate. Triethylamine hydrochloride was added thereto to obtain methacryloyloxyethyl isocyanate containing about 200 ppm of triethylamine hydrochloride.

Synthesis Example A-3

Ethanolamine hydrochloride and acrylic acid were reacted to synthesize 2-acryloyloxy-ethylammonium chloride. Next, acrylic acid-2-[(imidazole-1-carbonyl)-amino] ethyl ester was synthesized by reacting carbonyl diimidazole with 2-acryloyloxy-ethyl ammonium chloride. Next, acryloyloxyethyl isocyanate (hereinafter sometimes referred to as AOI) was obtained by reacting the obtained acrylic acid-2-[(imidazole-1-carbonyl)-amino] ethyl ester with hydrogen chloride.

Synthesis Example A-4

2-aminoethyl acrylate hydrochloride was produced from acrylic acid and ethanolamine, and then the obtained 2-aminoethyl acrylate hydrochloride was reacted with phosgene to synthesize 3-chloropropionic acid ester derivative. Next, the obtained 3-chloropropionic acid ester derivative was dehydrochlorinated in the presence of a triethylamine to obtain acryloyloxyethyl isocyanate. About 200 ppm of triethylamine hydrochloride was contained in the acryloyloxyethyl isocyanate.

Synthesis Example D-1

A purified isocyanate solution was supplied to a multi-stage distillation column (selected from an ordered packing distillation column, an irregular packing distillation column, and a tray column distillation column). The pressure at the top of the distillation column was controlled (absolute pressure), and the amount of heat necessary for distillation was supplied from the reboiler. After the temperature distribution in the tower was stabilized, a fraction was withdrawn from the side cut line provided below in the height direction from the top of the column. The resulting fraction was analyzed.

Synthesis Example D-2

An isocyanate solution to be purified was supplied to a falling-thin film type molecular distiller (for example, MS-300 model manufactured by Shibata Scientific Co., Ltd.), the vaporized component of the composition was caught on the cooler surface and pulled out to a collector.

Synthesis Example D-3

A heat quantity necessary for distillation was supplied to a falling film type evaporator with a heating medium jacket or a heater, the isocyanate composition to be purified was supplied from the upper part of the falling film type evaporator, and the gas phase gas was pulled out in countercurrent or in a combined flow.

Example 1

Preparation of Isocyanate Composition

Example 1

Preparation of Isocyanate Composition

The crude MOI obtained in Synthesis Example A-1 was purified by distillation at a jacket temperature of 80° C. and a pressure of 0.7 kPa using a falling-thin film type molecular distiller (MS-300 model manufactured by Shibata Scientific Co., Ltd.) to obtain a purified MOI. The MOI content of the purified MOI measured by GC was 99% by mass or more. A dimethyl carbonate was added thereto so as to be 13 ppm by mass with respect to the MOI mass to prepare an isocyanate composition including MOI and a dimethyl carbonate. APHA was 25.

Storage of Isocyanate Composition 500 g of the isocyanate composition obtained above was placed in a 1-L SUS storage container, replaced with nitrogen and stored, and stored for 300 days in a storage environment in the Kojima district of Kurashiki, Okayama Prefecture, Japan. After completion of the storage period, the molecular weight was measured by GPC. As a result, the peak on the side representing higher molecular weight than the peak representing the compound represented by methacryloyloxyethyl isocyanate (referred to as peak 1) was about 8% with respect to the peak 1. In addition, APHA was 30.

Synthesis Example B-1

100 g (645 mmol) of MOI synthesized according to Synthesis Example A-1 and purified in the same manner as in Example 1 and 60.7 g (645 mmol) of a phenol were heated and reacted at 100° C. in a nitrogen atmosphere. The reaction product was analyzed by liquid chromatography, and it was confirmed that the residual amount of the phenol was below the detection limit. The reaction product was referred to as "reaction product of isocyanate and phenol" and was used as "N-substituted carbamic acid ester".

Example 2

Preparation of Isocyanate Composition

The crude MOI obtained in Synthesis Example A-1 was purified by distillation at a jacket temperature of 80° C. and a pressure of 0.7 kPa using a falling-thin film type molecular distiller (MS-300 model manufactured by Shibata Scientific Co., Ltd.) to obtain a purified MOI. The content of methacryloyloxyethyl isocyanate in the purified MOI measured by GC was 99% by mass or more and APHA was 20. A reaction product of the isocyanate obtained in Synthesis Example B-1 and a phenol was added thereto in an amount of 20 ppm by mass with respect to the MOI mass to prepare an isocyanate composition including MOI and a reaction product of isocyanate and phenol.

Storage of Isocyanate Composition

The above-prepared isocyanate composition was stored in the same manner as in Example 1. The results are shown in Table 1.

Synthesis Example B-2

10.5 mg ($4.6 \times 10^{-2}$ mmol) of a titanium catalyst represented by the following formula (18) and a methacryloyloxyethyl isocyanate were allowed to react under a nitrogen atmosphere at 25° C. for 24 hours. The obtained reaction product was a compound having a UV absorption in a spectral region of a decamer or higher isocyanate measured by gel permeation chromatography. The gel permeation chromatography chart of the reaction product is shown in FIG. 1. In FIG. 1, the horizontal axis represents a retention time of the gel permeation chromatograph and the vertical axis represents an absorption of the UV detector (wavelength 254 nm). The retention time stated as "MOI decamer" represents a retention time of a molecular weight corresponding to the MOI decamer and the retention time stated as "MOI" represents a retention time of a molecular weight corresponding to MOI.

[Chemical formula 26]

(18)

Example 3

Preparation of Isocyanate Composition

The MOI synthesized according to Synthesis Example A-1 and purified in the same manner as in Example 1 and the reaction product obtained in Synthesis Example B-2 were mixed to prepare a composition including an MOI and a compound having a UV absorption in a spectral region of a decamer or higher isocyanate. In the isocyanate composition, the concentration of the compound having a UV absorption in a spectral region of a decamer or higher isocyanate was 30 ppm by mass with respect to the MOI mass.

Example 4

Preparation of Isocyanate Composition

The AOI obtained in Synthesis Example A-3 and an ethylbenzene were mixed to prepare an isocyanate composition including an AOI and an ethylbenzene. In the isocyanate composition, the concentration of the ethylbenzene was 50 ppm by mass with respect to the MOI mass.

Storage of Isocyanate Composition

The above-prepared isocyanate composition was stored in the same manner as in Example 1. The results are shown in Table 1.

Examples 5 to 75, Comparative Examples 1 to 14

A crude isocyanate was synthesized by a known method, and the crude isocyanate was purified by any of the methods of Synthesis Examples D-1 to D-3. Then, the obtained purified isocyanate was used to prepare an isocyanate composition, and the isocyanate composition was stored in the same manner as Example 1. The results are shown in Tables 1 to 5. In addition, in Comparative Examples 2, 4 and 6, a gel was generated in the isocyanate after storage and GPC measurement was unable to be carried out.

In the tables, MOI represents a methacryloyloxyethyl isocyanate and AOI represents an acryloyloxyethyl isocyanate. In addition, as in Synthesis Example B-1, when a compound obtained by a reaction of an isocyanate and a phenol was used as the compound represented by formula (2) of the present invention, the reaction product was referred to as "reaction product of isocyanate and phenol".

In the synthesis of the compound corresponding to the compound represented by formula (1), an isocyanate contained in the isocyanate composition was used as the isocyanate, and one equivalent of a hydroxy compound (aromatic hydroxy compound or alcohol) with respect to the isocyanate group of the isocyanate was used. In Examples ○○ and Comparative Examples ○○, the "compound having a UV absorption in a spectral region of a decamer or higher isocyanate" was prepared in the same manner as in Synthesis Example B-2, except the isocyanate contained in the isocyanate composition was used instead of the methacryloyloxyethyl isocyanate.

In addition, as the compound containing an isocyanurate group and/or a biuret group, duranate TPA-100, TKA-100 and TLA-100 manufactured by Asahi Kasei Corporation were used.

In the table, the amounts of phosphoric acid and phosphoric acid ester represent the actually added amounts, and the amounts of other components represent the analytical values of the composition.

Comparative Example 1

The methacryloyloxyethyl isocyanate obtained in Synthesis Example A-2 was used, and distillation was carried out using a multistage distillation column. After removing about 25% of the fraction with respect to the charged amount of the methacryloyloxyethyl isocyanate, the methacryloyloxyethyl isocyanate was recovered. The internal temperature of the distillation apparatus was 75° C. to 78° C., and the pressure was 0.7 kPa.

The obtained isocyanate was used as an isocyanate composition and stored in the same manner as in Example 1. The results are shown in Table 5.

Comparative Example 2

The acryloyloxyethyl isocyanate obtained in Synthesis Example A-4 was used, and distillation was carried out using a multistage distillation column. After removing about 25% of the fraction with respect to the charged amount of the acryloyloxyethyl isocyanate, the acryloyloxyethyl isocyanate was recovered. The internal temperature of the distillation apparatus was 62° C. to 67° C., and the pressure was 0.7 kPa.

The obtained isocyanate was used as an isocyanate composition and stored in the same manner as in Example 1. The results are shown in Table 5.

Example E-1

200 g of a hexamethylene diisocyanate and 200 g of the composition of Example 1 were weighed and placed in a reaction apparatus provided with a thermometer, a stirrer, a nitrogen seal tube and a 500-mL four-necked glass flask, followed by replacing with a reactor nitrogen, and heating to 65° C. Thereafter, 140 g of a 2-ethylhexanol was added and stirring was carried out for 10 minutes. Thereafter, 50 g of a 5% isobutanol solution of tetrabutylammonium acetate was added over a period of 60 minutes. During the reaction, the temperature was adjusted to 65±2° C. 5 g of a 85% phosphoric acid aqueous solution as a reaction-terminating agent was added and the temperature was raised to 100° C. After the temperature reached 100° C., stirring was continued for 1 hour. The reaction solution was a colorless transparent liquid. The reaction solution was filtered through a membrane filter having a pore size of 1 μm to separate the reaction residue, and the unreacted hexamethylene diisocyanate and MOI were distilled off by a thin film distillation apparatus to obtain a polyisocyanate composition. The obtained polyisocyanate composition was almost colorless and transparent. 5 g of a polyisocyanate composition was obtained, 5 g of a phenol and 10 g of an acetonitrile were added and stirred at 80° C. for 24 hours to react the isocyanate group in the mixture with the phenol to obtain a carbamate. The mixture was analyzed by liquid chromatography, and the following four compounds were observed.

[Chemical formula 27]
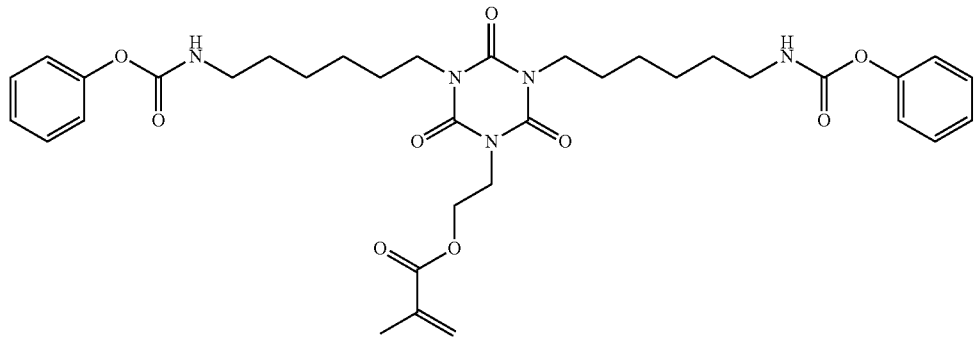
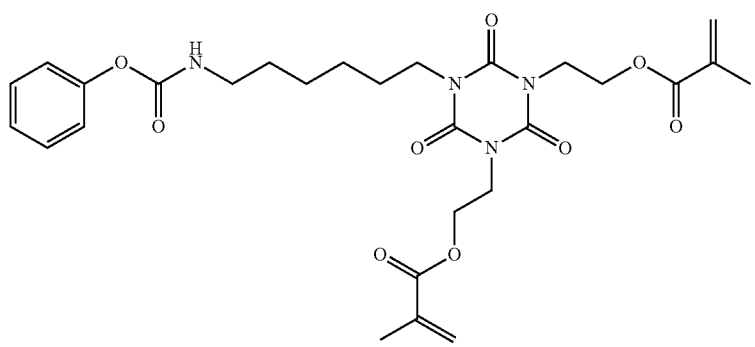
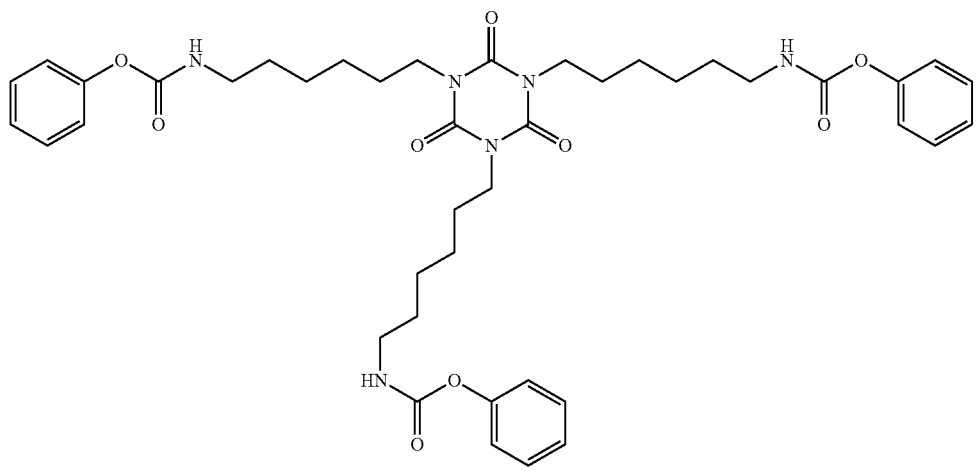
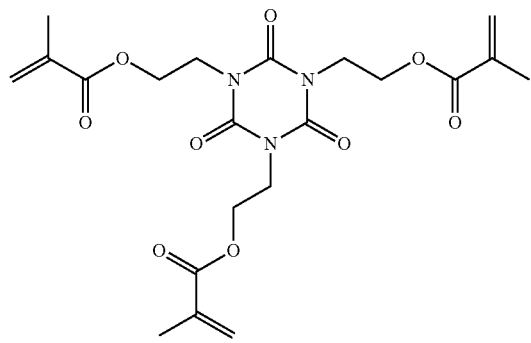

Therefore, the following four compounds represent the compound containing an isocyanate group before being reacted with a phenol, and it is understood that the compounds shown below were produced in this Example E-1.

[Chemical formula 28]

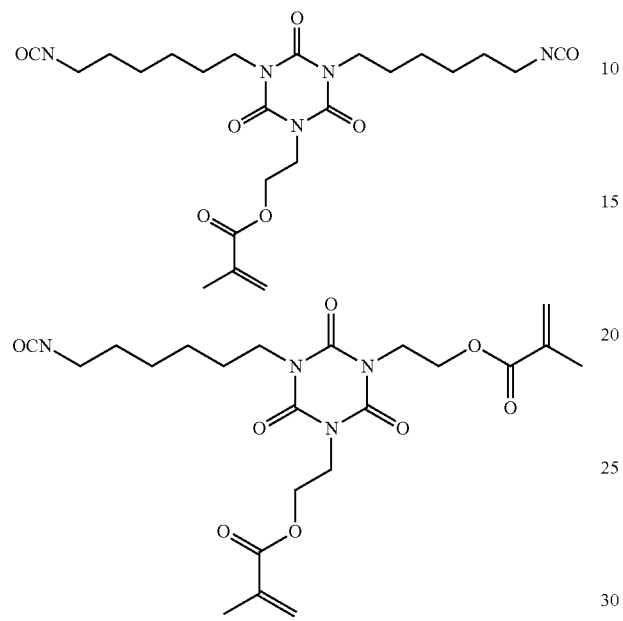
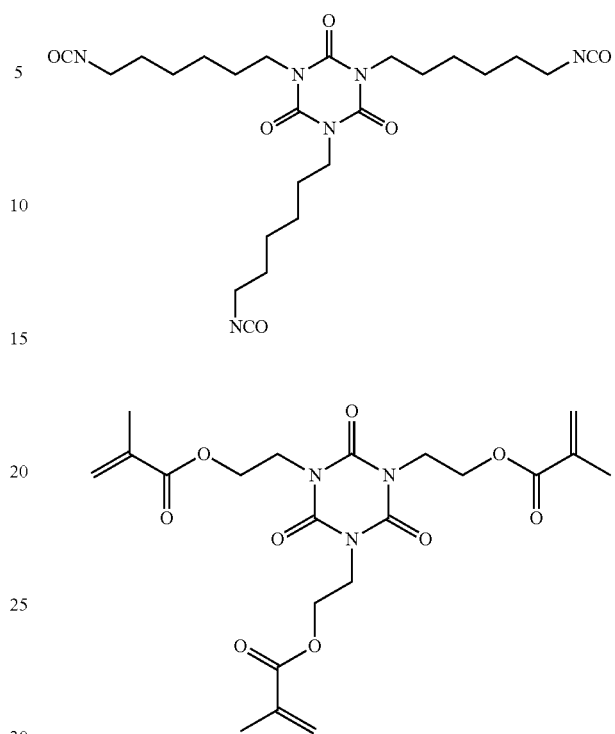

TABLE 1

| | | | Compound Contained in Composition | | Before Storage APHA | After 300-Day Storage | |
|---|---|---|---|---|---|---|---|
| | Isocyanate | | | Content Based on Isocyanate (ppm by mass) | | Area of Peak 2 to Area of Peak 1 with GPC Measurement (%) | APHA |
| | | Content (mass %) | Compound | | | | |
| Ex. 1 | MOI | 99 | ⟨structure: dimethyl carbonate⟩ | 13 | 25 | 8 | 30 |
| Ex. 2 | MOI | 99 | reaction product of isocyanate and phenol | 20 | 20 | 9 | 25 |
| Ex. 3 | MOI | 99 | compound having a UV absorption in a region of a decamer or higher isocyanate | 30 | 20 | 8 | 20 |
| Ex. 4 | AOI | 99 | ethyl benzene | 50 | 10 | 7 | 18 |
| Ex. 5 | MOI | 99 | di-2-ethylhexyl phosphate | 30 | 10 | 3 | 17 |
| Ex. 6 | MOI | 99 | diisodecyl phthalate | 123 | 11 | 6 | 18 |
| Ex. 7 | MOI | 99 | reaction product of isocyanate and phenol | 66 | 10 | 8 | 18 |
| Ex. 8 | MOI | 99 | decyl ether; octyl stearate; | 170 49 | 11 | 7 | 19 |
| Ex. 9 | MOI | 99 | ⟨structure: diphenyl carbonate⟩; reaction product of isocyanate and dipentylphenol | 240 66 | 10 | 7 | 19 |
| Ex. 10 | MOI | 99 | butylphenyl ether; distearyl phosphate; | 120 60 | 11 | 2 | 19 |
| Ex. 11 | MOI | 99 | dibutyl phosphate | 5 | 15 | 5 | 20 |
| Ex. 12 | MOI | 99 | phenyl methacrylate | 500 | 10 | 5 | 18 |
| Ex. 13 | MOI | 99 | methyl methacrylate | 800 | 15 | 5 | 20 |
| Ex. 14 | AOI | 99 | reaction product of isocyanate and methanol | 330 | 22 | 9 | 32 |

TABLE 1-continued

| | Isocyanate | | Compound Contained in Composition | | Before Storage APHA | After 300-Day Storage | |
|---|---|---|---|---|---|---|---|
| | | Content (mass %) | Compound | Content Based on Isocyanate (ppm by mass) | | Area of Peak 2 to Area of Peak 1 with GPC Measurement (%) | APHA |
| Ex. 15 | MOI | 99 | 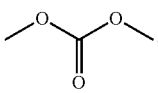 ; 1-octene; | 500<br>5 | 15 | 7 | 25 |
| Ex. 16 | MOI | 99 | octadecane | 50 | 25 | 7 | 25 |
| Ex. 17 | MOI | 99 | Benzyl butyl phthalate | 980 | 20 | 2 | 25 |
| Ex. 18 | AOI | 99 | styrene;<br>xylene; | 300<br>500 | 26 | 2 | 38 |
| Ex. 19 | MOI | 99 | dibutyl phosphate | 95 | 20 | 8 | 28 |
| Ex. 20 | MOI | 99 | 2,4,4-trimethylpentene | 1200 | 27 | 6 | 47 |
| Ex. 21 | AOI | 99 | ethylbenzene | 7000 | 25 | 8 | 46 |
| Ex. 22 | MOI | 99 | 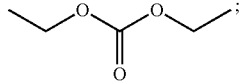 ; reaction product of isocyanate and ethanol; | 90<br>850 | 15 | 1 | 20 |
| Ex. 23 | MOI | 99 | compound having a UV absorption in a region of a decamer or higher isocyanate | 3 | 10 | 8 | 45 |
| Ex. 24 | MOI | 99 | 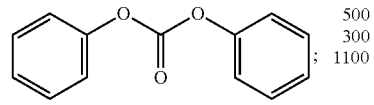 ; reaction product of isocyanate and phenol; benzyltoluene; | 500<br>300<br>1100 | 17 | 2 | 33 |
| Ex. 25 | MOI | 99 | 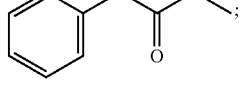 ; pentadecane; | 80<br>130 | 14 | 0 | 29 |
| Ex. 26 | AOI | 99 | reaction product of isocyanate and p-cumylphenol; decamethyltetrasiloxane; | 2100<br>180 | 26 | 1 | 39 |

TABLE 2

| | Isocyanate | | Compound Contained in Composition | | Before Storage APHA | After 300-Day Storage | |
|---|---|---|---|---|---|---|---|
| | | Content (mass %) | Compound | Content Based on Isocyanate (ppm by mass) | | Area of Peak 2 to Area of Peak 1 with GPC Measurement (%) | APHA |
| Ex. 27 | AOI | 99 | 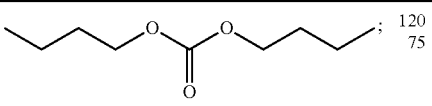 ; dimethyl sulfide; | 120<br>75 | 22 | 1 | 39 |
| Ex. 28 | MOI | 99 | benzyl butyl phthalate | 20 | 20 | 2 | 25 |
| Ex. 29 | MOI | 99 | decyl ether | 920 | 25 | 9 | 35 |

TABLE 2-continued

| | | Compound Contained in Composition | | | After 300-Day Storage | |
|---|---|---|---|---|---|---|
| | Isocyanate | | Content Based | Before | Area of Peak 2 to Area of Peak 1 with | |
| | | Content (mass %) | Compound | on Isocyanate (ppm by mass) | Storage APHA | GPC Measurement (%) | APHA |
| Ex. 30 | AOI | 99 | ethylbenzene | 3000 | 15 | 8 | 45 |
| Ex. 31 | MOI | 99 | dimethyl carbonate structure; 2-methylbutene; | 8400 3 | 25 | 9 | 55 |
| Ex. 32 | AOI | 99 | reaction product of isocyanate and cyclohexanol; | 800 | 28 | 8 | 44 |
| Ex. 33 | AOI | 99 | urea (H₂N-C(=O)-NH₂); diphenyl ether; | 10 200 | 15 | 1 | 16 |
| Ex. 34 | AOI | 99 | compound having a UV absorption in a region of a decamer or higher isocyanate | 10 | 16 | 10 | 16 |
| Ex. 35 | AOI | 99 | methanesulfonic acid | 20 | 15 | 1 | 16 |
| Ex. 36 | AOI | 99 | palmitic acid isopropyl ester | 80 | 15 | 7 | 16 |
| Ex. 37 | AOI | 99 | reaction product of isocyanate and phenol | 100 | 16 | 7 | 16 |
| Ex. 38 | AOI | 99 | benzyl toluene; acetyl triethyl citrate; | 120 50 | 17 | 9 | 18 |
| Ex. 39 | AOI | 99 | phenyl propanoate structure; reaction product of isocyanate and dipentylphenol; | 140 40 | 16 | 5 | 16 |
| Ex. 40 | AOI | 99 | dibenzyltoluene; phosphoric acid; | 50 14 | 15 | 1 | 17 |
| Ex. 41 | AOI | 99 | ethyl carbamate (EtO-C(=O)-NH₂); α-methylstyrene; reaction product of isocyanate and 4-term-amylphenol; | 30 150 930 | 16 | 2 | 20 |
| Ex. 42 | MOI | 99 | reaction product of isocyanate and 4-cumylphenol | 5000 | 24 | 5 | 55 |
| Ex. 43 | AOI | 99 | phenyl carbamate (PhO-C(=O)-NH₂); anisole; | 80 350 | 13 | 2 | 28 |
| Ex. 44 | MOI | 99 | butyl phenyl ether | 70 | 16 | 8 | 16 |
| Ex. 45 | MOI | 99 | dibutyl phosphoric acid; duranate TLA-100 (manufactured by Asahi Kasei Corporation); | 90 200 | 29 | 10 | 30 |
| Ex. 46 | MOI | 99 | reaction product of isocyanate and 4-tert-octylphenol; diisopropyl phosphate; | 550 30 | 14 | 7 | 14 |

TABLE 2-continued

| | | Compound Contained in Composition | | | After 300-Day Storage | |
|---|---|---|---|---|---|---|
| | Isocyanate | | Content Based | Before | Area of Peak 2 to Area of Peak 1 with | |
| | Content (mass %) | Compound | on Isocyanate (ppm by mass) | Storage APHA | GPC Measurement (%) | APHA |
| Ex. 47 | MOI 99 | ethyl carbonate structure; chlorine; bromine; | 300 70 1 | 21 | 3 | 29 |

TABLE 3

| | | Compound Contained in Composition | | | After 300-Day Storage | |
|---|---|---|---|---|---|---|
| | Isocyanate | | Content Based | Before | Area of Peak 2 to Area of Peak 1 with | |
| | Content (mass %) | Compound | on Isocyanate (ppm by mass) | Storage APHA | GPC Measurement (%) | APHA |
| Ex. 48 | AOI 99 | methacrylate carbamate structure; chlorine; | 500 40 | 20 | 0 | 24 |
| Ex. 49 | MOI 99 | compound having a UV absorption in a region of a decamer or higher isocyanate; dimethyl carbonate; benzyl toluene; phenyl methacrylate; | 110 1000 1000 1000 | 21 | 8 | 22 |
| Ex. 50 | AOI 99 | xylene; chlorine; bromine; | 5000 89 1 | 23 | 1 | 30 |
| Ex. 51 | MOI 99 | methyl carbamate NH$_2$; | 90 8 61 | 14 | 4 | 19 |
| | | methacrylate ethyl carbamate structure; chlorine; | | | | |
| Ex. 52 | MOI 99 | benzyl toluene; chlorine; | 250 5 | 15 | 2 | 23 |
| Ex. 53 | MOI 99 | phosphoric acid; | 850 | 15 | 10 | 55 |
| Ex. 54 | AOI 99 | Octadecane; chlorine; | 95 51 | 11 | 2 | 20 |
| Ex. 55 | MOI 99 | diphenyl carbonate structure; diphenyl ether; chlorine; | 5 960 1 | 14 | 4 | 22 |
| Ex. 56 | AOI 99 | decamethyltetrasiloxane; chlorine; | 800 68 | 22 | 1 | 29 |

TABLE 3-continued

| | Isocyanate | Content (mass %) | Compound Contained in Composition | | Before Storage APHA | After 300-Day Storage | |
|---|---|---|---|---|---|---|---|
| | | | Compound | Content Based on Isocyanate (ppm by mass) | | Area of Peak 2 to Area of Peak 1 with GPC Measurement (%) | APHA |
| Ex. 57 | AOI | 99 | Dimethyl sulfide; chlorine; | 230 75 | 13 | 3 | 13 |
| Ex. 58 | MOI | 99 | decyl ether; chlorine; bromine | 16 77 1 | 18 | 0 | 23 |
| Ex. 59 | MOI | 99 | butyl phenyl ether; 2,4,4-trimethylpentene; chlorine; | 70 10 66 | 25 | 4 | 31 |
| Ex. 60 | MOI | 99 | (dimethyl carbonate structure) | 970 | 20 | 8 | 25 |
| Ex. 61 | MOI | 99 | phosphoric acid | 2 | 15 | 10 | 45 |
| Ex. 62 | MOI | 99 | compound having a UV absorption in a region of a decamer or higher isocyanate; diphenyl carbonate; dibenzyltoluene; | 110 1000 1000 | 18 | 8 | 35 |
| Ex. 63 | AOI | 99 | duranate TKA-100; diphenyl carbonate; benzyl toluene; phenyl acrylate; reaction product of isocyanate and phenol; dibutyl phosphoric acid; | 500 800 800 800 500 50 | 20 | 10 | 30 |
| Ex. 64 | MOI | 99 | benzyl butyl phthalate | 20 | 15 | 2 | 20 |

TABLE 4

| | Isocyanate | Content (mass %) | Compound Contained in Composition | | Before Storage APHA | After 300-Day Storage | |
|---|---|---|---|---|---|---|---|
| | | | Compound | Content Based on Isocyanate (ppm by mass) | | Area of Peak 2 to Area of Peak 1 with GPC Measurement (%) | APHA |
| Ex. 65 | MOI | 99 | compound having a UV absorption in a region of a decamer or higher isocyanate | 980 | 10 | 10 | 50 |
| Ex. 66 | AOI | 99 | duranate TPA-100 (manufactured by Asahi Kasei Corporation) | 9200 | 25 | 10 | 60 |
| Ex. 67 | MOI | 99 | duranate TKA-100 (manufactured by Asahi Kasei Corporation) | 20 | 20 | 3 | 26 |
| Ex. 68 | AOI | 99 | (acrylate carbamate phenyl structure) | 2 | 25 | 15 | 63 |
| Ex. 69 | AOI | 99 | (acrylate carbamate phenyl structure) | 9500 | 20 | 15 | 55 |
| Ex. 70 | MOI | 99 | (dimethyl carbonate structure) | 9700 | 20 | 8 | 55 |
| Ex. 71 | MOI | 99 | benzyl butyl phthalate | 9800 | 40 | 2 | 80 |
| Ex. 72 | MOI | 99 | compound having a UV absorption in a region of a decamer or higher isocyanate | 9800 | 10 | 15 | 50 |

TABLE 4-continued

| | Isocyanate | | Compound Contained in Composition | | | After 300-Day Storage | |
|---|---|---|---|---|---|---|---|
| | | Content (mass %) | Compound | Content Based on Isocyanate (ppm by mass) | Before Storage APHA | Area of Peak 2 to Area of Peak 1 with GPC Measurement (%) | APHA |
| Ex. 73 | MOI | 99 | dimethyl carbonate (structure) | 1.5 | 25 | 8 | 65 |
| Ex. 74 | MOI | 99 | duranate TKA-100 (manufactured by Asahi Kasei Corporation) | 890 | 20 | 3 | 26 |
| Ex. 75 | AOI | 99 | duranate TPA-100 (manufactured by Asahi Kasei Corporation) | 1.5 | 30 | 10 | 75 |

TABLE 5

| | Isocyanate | | Compound Contained in Composition | | | After 300-Day Storage | |
|---|---|---|---|---|---|---|---|
| | | Content (mass %) | Compound | Content Based on Isocyanate (ppm by mass) | Before Storage APHA | Area of Peak 2 to Area of Peak 1 with GPC Measurement (%) | APHA |
| Comp. Ex. 1 | MOI | 99 | dimethyl carbonate (structure) | 12000 | 25 | 15 | 130 |
| Comp. Ex. 2 | MOI | 99 | dimethyl carbonate (structure) | 0.5 | 16 | unable to measure due to the generation of gel | 40 |
| Comp. Ex. 3 | AOI | 99 | ethylbenzene | 25000 | 19 | 12 | 150 |
| Comp. Ex. 4 | AOI | 99 | ethylbenzene | 0.3 | 30 | unable to measure due to the generation of gel | 60 |
| Comp. Ex. 5 | AOI | 99 | phenyl carbamate acrylate (structure) | 12000 | 20 | 15 | 90 |
| Comp. Ex. 6 | AOI | 99 | phenyl carbamate acrylate (structure) | 0.5 | 15 | 20 | 85 |
| Comp. Ex. 7 | MOI | 99 | triethylamine hydrochloride; chlorine; bromine; | 0.04 150 2 | 13 | 12 | 120 |
| Comp. Ex. 8 | AOI | 99 | triethylamine hydrochloride; chlorine; bromine; | 0.03 180 3 | 21 | 13 | 130 |
| Comp. Ex. 9 | MOI | 99 | Benzyl butyl phthalate | 0.3 | 19 | unable to measure due to the generation of gel | 80 |
| Comp. Ex. 10 | MOI | 99 | Benzyl butyl phthalate | 12000 | 27 | 22 | 150 |
| Comp. Ex. 11 | MOI | 99 | compound having a UV absorption in a region of a decamer or higher isocyanate | 12000 | 25 | unable to measure due to the generation of gel | 80 |
| Comp. Ex. 12 | MOI | 99 | compound having a UV absorption in a region of a decamer or higher isocyanate | 0.5 | 15 | 22 | 140 |

TABLE 5-continued

| | | Compound Contained in Composition | | | After 300-Day Storage | |
|---|---|---|---|---|---|---|
| | Isocyanate | | | | Area of Peak 2 to | |
| | | Content | | Content Based | Before | Area of Peak 1 with |
| | | (mass %) | Compound | on Isocyanate (ppm by mass) | Storage APHA | GPC Measurement (%) | APHA |
| Comp. Ex. 13 | MOI | 99 | duranate TPA-100 (manufactured by Asahi Kasei Corporation) | 11000 | 25 | unable to measure due to the generation of gel | 75 |
| Comp. Ex. 14 | MOI | 99 | duranate TPA-100 (manufactured by Asahi Kasei Corporation) | 0.5 | 15 | 22 | 130 |

The invention claimed is:

1. An isocyanate composition, comprising
an isocyanate compound having an ethylenically unsaturated bond; and
1.0 to $1.0\times10^4$ ppm by mass of a compound represented by the following formula (1) which is different from the isocyanate compound with respect to a total mass of the isocyanate compound, and/or
1.0 to $1.0\times10^4$ ppm by mass of a compound having a UV absorption in a spectral region of a decamer or higher isocyanate measured by gel permeation chromatography with respect to a total mass of the isocyanate compound, and/or
1.0 to $1.0\times10^4$ ppm by mass of a compound having an isocyanurate group and/or a biuret group with respect to a total mass of the isocyanate compound,

$$R^1-(COO-R^2)_a \qquad (1)$$

(in the formula, $R^1$ represents an a-valent aliphatic group having 2 to 10 carbon atoms or aromatic group having 6 to 10 carbon atoms, $R^2$ represents a monovalent aliphatic group having 2 to 10 carbon atoms or aromatic group having 6 to 25 carbon atoms, and a represents an integer of 1 or 2).

2. The isocyanate composition according to claim 1, wherein the isocyanate composition further comprises, with respect to a total mass of the isocyanate compound,
1.0 to $2.0\times10^4$ ppm by mass of at least one inert compound selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound, the inert compound not having a carbon-carbon unsaturated bond and a carbon-oxygen double bond other than an unsaturated bond constituting an aromatic ring.

3. The isocyanate composition according to claim 1, wherein the isocyanate composition further comprises 1.0 to $2.0\times10^4$ ppm by mass of a carbonic acid derivative with respect to a total mass of the isocyanate compound.

4. The isocyanate composition according to claim 1, wherein the isocyanate composition further comprises, with respect to a total mass of the isocyanate compound,
1.0 to $1.0\times10^2$ ppm by mass of a sulfuric acid and/or a sulfuric ester, and/or
1.0 to $1.0\times10^2$ ppm by mass of a phosphoric acid and/or a phosphoric ester.

5. The isocyanate composition according to claim 1, wherein the isocyanate composition further comprises, with respect to a total mass of the isocyanate compound,
1.0 to $1.0\times10^4$ ppm by mass of a basic amino compound, and/or a halogen ion, and/or a hydrolysable halogen compound.

6. An isocyanate composition, comprising
an isocyanate compound having an ethylenically unsaturated bond; and
with respect to a total mass of the isocyanate compound, 1.0 to $1.0\times10^4$ ppm by mass of a compound different from the isocyanate compound and having at least one unsaturated bond other than an unsaturated bond constituting an aromatic ring, or
with respect to a total mass of the isocyanate compound, 1.0 to $2.0\times10^4$ ppm by mass of an inert compound not having a carbon-carbon unsaturated bond other than an unsaturated bond constituting an aromatic ring, which is at least one selected from the group consisting of a hydrocarbon compound, an ether compound, a sulfide compound, a halogenated hydrocarbon compound, a silicon-containing hydrocarbon compound, a silicon-containing ether compound and a silicon-containing sulfide compound with respect to a total mass of the isocyanate compound, and/or 1.0 to $1.0\times10^2$ ppm by mass of a sulfuric acid and/or a sulfuric ester, and/or 1.0 to $1.0\times10^2$ ppm by mass of a phosphoric acid, and/or a phosphoric ester,
wherein the compound different from the isocyanate compound and having at least one unsaturated bond other than an unsaturated bond constituting an aromatic ring is at least one selected from the group consisting of the compounds represented by formulas (5), (6), (7) and (2),

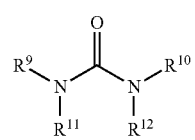

(5)

in which each of $R^9$, $R^{10}$, $R^{11}$ and $R^{12}$ independently represents an aliphatic group having 1 to 20 carbon atoms, an aliphatic group having 7 to 20 carbon atoms and substituted with an aromatic compound, an aromatic group having 6 to 20 carbon atoms or a hydrogen atom, a total number of carbon atoms constituting $R^9$ and $R^{11}$ is an integer of 0 to 20, and a total number of carbon atoms constituting $R^{10}$ and $R^{12}$ is an integer of 0 to 20, (6)

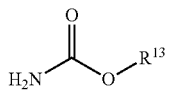

in which R$^{13}$ represents an aliphatic group having 1 to 20 carbon atoms, an aliphatic group having 7 to 20 carbon atoms and substituted with an aromatic group, or an aromatic group having 6 to 20 carbon atoms.

(7)

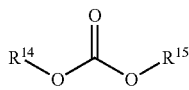

in which each of R$^{14}$ and R$^{15}$ independently represents an aliphatic group having 1 to 20 carbon atoms, an aliphatic group having 7 to 20 carbon atoms and substituted with an aromatic group, an aromatic group having 6 to 20 carbon atoms, (2)

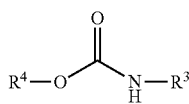

in which R$^3$ represents a residue obtained by removing an isocyanate group from an isocyanate compound having an ethylenically unsaturated bond, and R$^4$ represents an organic group.

7. The isocyanate composition according to claim 6, including
   the isocyanate compound; and
   the compound different from the isocyanate compound and having at least one unsaturated bond other than an unsaturated bond constituting an aromatic ring.

8. The isocyanate composition according to claim 6, wherein
   the carbonic acid derivative is at least one compound selected from the group consisting of a carbonic acid ester, N-unsubstituted carbamic acid ester, and N-substituted carbamic acid ester.

9. The isocyanate composition according to claim 8, wherein
   the N-substituted carbamic acid ester is a compound represented by the following formula (2)

(2)

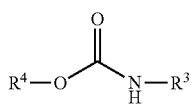

[in formula (2), R$^3$ represents an isocyanate group-removed residue of the isocyanate compound, and R$^4$ represents an organic group].

10. The isocyanate composition according to claim 6, including the isocyanate compound and the inert compound.

11. The isocyanate composition according to claim 6, including the isocyanate compound, the compound different from the isocyanate compound and having at least one unsaturated bond other than an unsaturated bond constituting an aromatic ring, and the inert compound.

12. The isocyanate composition according to claim 11, including the isocyanate compound, and the compound different from the isocyanate compound and having at least one unsaturated bond other than an unsaturated bond constituting an aromatic ring, wherein
    the unsaturated bond other than an unsaturated bond constituting an aromatic ring is a double bond between carbon and oxygen.

13. The isocyanate composition according to claim 12, wherein
    the compound having at least one unsaturated bond other than an unsaturated bond constituting an aromatic ring is a carbonic acid derivative.

14. The isocyanate composition according to claim 13, wherein
    the carbonic acid derivative is at least one compound selected from the group consisting of a carbonic acid ester, an N-unsubstituted carbamic acid ester, and an N-substituted carbamic acid ester.

15. The isocyanate composition according to claim 1, wherein
    97% by mass or more of the isocyanate compound is included with respect to a total mass of the isocyanate composition.

16. A process for producing an isocyanate polymer, including
    a step of mixing the isocyanate composition according to claim 1 and an isocyanate having two or more functional groups, and reacting the isocyanate compound contained in the isocyanate composition with the isocyanate having two or more functional groups, wherein
    the isocyanate polymer contains a unit represented by the following formula (11), and
    a nitrogen atom constituting the isocyanate polymer is bonded to a carbon atom, (11)

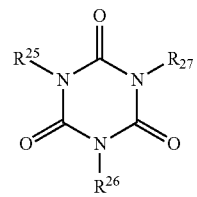

[in formula (11), each of R$^{25}$, R$^{26}$, and R$^{27}$ independently represents an isocyanate group-removed residue of the isocyanate compound contained in the isocyanate composition, or an isocyanate group-removed residue of the isocyanate having two or more functional groups, and at least one of R$^{25}$, R$^{26}$ and R$^{27}$ represents an isocyanate group-removed residue of the isocyanate compound contained in the isocyanate composition].

17. A process for producing an isocyanate polymer, including
    a step of mixing the isocyanate composition defined in claim 6 and an isocyanate having two or more functional groups, and reacting the isocyanate compound contained in the isocyanate composition with the isocyanate having two or more functional groups, wherein
    the isocyanate polymer contains a unit represented by the following formula (11), and a nitrogen atom constituting the isocyanate polymer is bonded to a carbon atom,

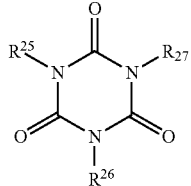
(11)

in which each of $R^{25}$, $R^{26}$, and $R^{27}$ independently represents an isocyanate group-removed residue of the isocyanate compound contained in the isocyanate composition, or an isocyanate group-removed residue of the isocyanate having two or more functional groups, and at least one of $R^{25}$, $R^{26}$ and $R^{27}$ represents an isocyanate group-removed residue of the isocyanate compound contained in the isocyanate composition.

* * * * *